US010195590B2

(12) United States Patent
Kallesøe et al.

(10) Patent No.: US 10,195,590 B2
(45) Date of Patent: Feb. 5, 2019

(54) METHOD OF PREPARING A CATALYTIC STRUCTURE

(71) Applicant: Teknologisk Institut, Taastrup (DK)

(72) Inventors: Christian Kallesøe, København Ø (DK); Henrik Fanø Clausen, Taastrup (DK); Leif Højslet Christensen, Roskilde (DK); Torsten Lund-Olesen, København V. (DK); Mohammad Aref Hasen Mamakhel, Aarhus N. (DK); Bo Brummerstedt Iversen, Skødstrup (DK); Jacob Becker-Christensen, Aarhus N. (DK); David Friis Aarup, Risskov. (DK); Jan Hales, Søborg (DK)

(73) Assignee: TEKNOLOGISK INSTITUT, Taastrup (DK)

( * ) Notice: Subject to any disclaimer, the term of this patent is extended or adjusted under 35 U.S.C. 154(b) by 935 days.

(21) Appl. No.: 14/413,136

(22) PCT Filed: Jul. 5, 2013

(86) PCT No.: PCT/DK2013/050227
§ 371 (c)(1),
(2) Date: Jan. 6, 2015

(87) PCT Pub. No.: WO2014/005598
PCT Pub. Date: Jan. 9, 2014

(65) Prior Publication Data
US 2015/0202598 A1 Jul. 23, 2015

(30) Foreign Application Priority Data

Jul. 6, 2012 (EP) .................................... 12175384

(51) Int. Cl.
H01M 4/92 (2006.01)
B01J 21/18 (2006.01)
(Continued)

(52) U.S. Cl.
CPC ............. *B01J 23/462* (2013.01); *B01J 21/18* (2013.01); *B01J 21/185* (2013.01); *B01J 23/42* (2013.01);
(Continued)

(58) Field of Classification Search
CPC ............. H01M 4/86–4/96; H01M 8/10; B01J 21/00–21/18; B01J 23/00–23/50;
(Continued)

(56) References Cited

U.S. PATENT DOCUMENTS 5,789,027 A 8/1998 Watkins et al.
2004/0137214 A1 7/2004 Chen et al.
(Continued)

FOREIGN PATENT DOCUMENTS

JP 2007529627 A 10/2007
JP 20100521780 A 6/2010
(Continued)

OTHER PUBLICATIONS

Office Action (Notification of Reasons for Refusal) dated Jun. 20, 2017, by the Japanese Patent Office in Japanese Patent Application No. 2015-518852, and an English Translation of the Office Action. (9 pages).
(Continued)

Primary Examiner — Jonathan Crepeau
Assistant Examiner — Jacob Buchanan
(74) Attorney, Agent, or Firm — Buchanan Ingersoll & Rooney P.C.

(57) ABSTRACT

A method of preparing a catalytic structure the method including the steps of: providing a solution of a precursor compound in a solvent at ambient conditions; providing a suspension of a support material having a specific surface area of at least 1 m2/g in a solvent at ambient conditions; mixing the solution of the precursor compound and the
(Continued)

suspension of the support material; providing a reactive solvent in a supercritical or subcritical state; admixing the mixture of the solution of the precursor compound and the suspension of the support material in the supercritical or subcritical reactive solvent to form a reaction solution; injecting the reaction solution into a reactor tube via an inlet; allowing a reaction of the precursor compound in the supercritical or subcritical reactive solvent in the reactor tube to form the catalyst nanoparticles on the support material to provide the catalytic structure.

16 Claims, 10 Drawing Sheets

(51) Int. Cl.
| | |
|---|---|
| B01J 23/42 | (2006.01) |
| B01J 23/46 | (2006.01) |
| B01J 37/00 | (2006.01) |
| B01J 37/04 | (2006.01) |
| B01J 37/34 | (2006.01) |
| B01J 35/00 | (2006.01) |
| B01J 35/02 | (2006.01) |
| B01J 35/10 | (2006.01) |
| H01M 8/1018 | (2016.01) |

(52) U.S. Cl.
CPC ......... *B01J 35/0013* (2013.01); *B01J 35/026* (2013.01); *B01J 35/1009* (2013.01); *B01J 37/0072* (2013.01); *B01J 37/04* (2013.01); *B01J 37/343* (2013.01); *H01M 4/926* (2013.01); *H01M 2008/1095* (2013.01)

(58) Field of Classification Search
CPC .. B01J 35/00–35/10; B01J 37/00–37/04; B01J 37/343
See application file for complete search history.

(56) References Cited

U.S. PATENT DOCUMENTS

| | | | |
|---|---|---|---|
| 2005/0209095 A1* | 9/2005 | Brown | B01J 21/18 |
| | | | 502/150 |
| 2008/0220244 A1* | 9/2008 | Wai | B01J 21/185 |
| | | | 428/328 |
| 2008/0226958 A1 | 9/2008 | Sun et al. | |
| 2009/0075157 A1 | 3/2009 | Pak et al. | |
| 2011/0053039 A1* | 3/2011 | Pak | H01M 4/921 |
| | | | 429/483 |
| 2012/0094825 A1* | 4/2012 | Hattori | B01J 21/063 |
| | | | 502/182 |

FOREIGN PATENT DOCUMENTS

| | | | |
|---|---|---|---|
| JP | 2012053991 A | 3/2012 | |
| WO | WO 2005/069955 A2 | 8/2005 | |
| WO | 2005089935 A1 | 9/2005 | |
| WO | WO 2006/080702 A1 | 8/2006 | |
| WO | WO 2006/110822 A2 | 10/2006 | |
| WO | WO 2010150793 A1 * | 12/2010 | B01J 21/063 |

OTHER PUBLICATIONS

International Search Report (PCT/ISA/210) dated Sep. 20, 2013, by the European Patent Office as the International Searching Authority for International Application No. PCT/DK2013/050227.

Written Opinion (PCT/ISA/237) dated Sep. 20, 2013, by the European Patent Office as the International Searching Authority for International Application No. PCT/DK2013/050227.

Zhang, Y. et al "Supported Platinum Nanoparticles by Supercritical Deposition" Ind. Eng. Chem. Res., American chemical Society, vol. 44, 2005, pp. 4161-4164.

Liu, H. et al. "A review of anode catalysis in the direct methanol fuel cell" Journal of Power Sources, Elsevier B.V., vol. 155, 2006, pp. 95-110.

Office Action (Notification of Reason for Refusal) dated Oct. 31, 2018, by the Korean Patent Office in corresponding Korean Patent Application No. 10-2015-7003304, and an English Translation of the Office Action. (7 pages).

\* cited by examiner

METHOD OF PREPARING A CATALYTIC STRUCTURE

The present invention relates to a method of preparing a catalytic structure. The catalytic structure comprises catalytic nanoparticles formed on a support material. The catalytic nanoparticles may be metallic nanoparticles or nanoparticles comprising catalytic metal compounds. The catalytic structure may be employed in the catalytic conversion of compounds, such as in fuel cells or in industrial conversion of compounds.

PRIOR ART

In the field of catalytic conversion of compounds there is an ongoing desire to provide catalytic structures capable of more efficient conversion. A general trend has been to employ substrates of high specific surface area, such as carbon nanotubes (CNT), for deposition of nanosized catalytic particles with the aim of controlling the size and distribution of the particles on the support.

A specific area of relevance is the provision of catalytic structures in fuel cells. The development of portable electronic devices strives towards smaller devices typically having the same or higher power requirements, and the limited power density of conventional batteries becomes critical. Examples of such devices are microelectronic devices e.g. various microsensors, microengines, biomedical microsystems, microelectromechanical systems etc. The ideal power source for these types of devices would have larger power densities than presently used batteries, rechargeable capabilities and easy handling (when recharging). In general batteries are becoming inadequate with respect to the power requirements for portable electronics, and fuel cells, in particular direct alcohol fuel cell (DAFC), may present an alternative to batteries.

The principle of a fuel cell such as DAFC or PEMFC can roughly be divided into three main elements; the polymer electrolyte membrane, the catalyst/electrode assembly and the general system/cell structuring. The electrode assembly may consist of a gas diffusion layer (GDL) consisting of carbon paper with a microporous layer (MPL) on which the catalytic structure is situated, e.g. platinum on carbon support, which provides the catalytic conversion of the fuel to an electrical current.

Catalytic structures comprising CNT's with immobilised metal nanoparticles are known from the prior art. For example, Schlange et al. (Bei/stein *J. Org. Chem.*, 7:1412-1420, 2011) provide a process for the continuous preparation of CNT-supported platinum catalysts in a flow reactor. In the process multiwalled CNT's (MWCNT) are initially pre-treated by washing in HCl and $HNO_3$. After ultrasonication a platinum precursor ($H_2PtCl_6.6H_2O$) is reacted in an ethylene glycol solvent, which serves to reduce the platinum precursor and deposit platinum nanoparticles on the MWCNT. This process provided platinum particles in the size range of 0.8 nm to 2.8 nm on the MWCNT.

Dong et al. (*Carbon*, 48: 781-787, 2010) produce graphene-supported platinum and platinum-ruthenium nanoparticles for use in fuel cells. The process of Dong et al. involved the dispersion of graphene oxide powder in an ethylene glycol (EG) solution followed by addition of hexachloroplatinic acid EG solution or hexachloroplatinic acid EG solution also containing ruthenium chloride and allowing a reaction to take place under alkaline conditions. In alternative processes graphite and carbon black were employed as carbon supports. The processes afforded formation of nanoparticles, e.g. smaller than 10 nm, on the support materials. However, the process was slow and may not be easily scaleable, and furthermore, the size distribution of the nanoparticles prepared was not detailed.

Supercritical synthesis of the catalyst particles provides an approach to allow control of the size of the deposited particles. For example, WO 2005/069955 describes methods for preparing catalytic structures of nanostructures, e.g. CNT's, with catalytic metallic nanoparticles, e.g. with diameters between 2 and 12 nm. The catalytic structures of WO 2005/069955 can be configured to catalyse oxygen reduction or methanol oxidation in a fuel cell. The methods of WO 2005/069955 generally involve mixing a precursor in a carrier, e.g. carbon dioxide, and transforming the precursor to form a metal. The transformation of the precursor can occur in the carrier or on the surface of a nanostructure substrate. The metal may be formed in the carrier and can then be transported to the surface of the nanostructure substrate in the carrier while the carrier is in supercritical fluid form. Alternatively, the transformation may occur on the surface of the nanostructure substrate while the carrier is in supercritical fluid form. The precursor is a complex that contains the metal precursor and a ligand or moiety that solubilises the compound in the carrier.

U.S. Pat. No. 5,789,027 discloses processes for chemical deposition of thin films of material onto a substrate. In the process a precursor of the material is dissolved in a solvent under supercritical or near-supercritical conditions and subsequently exposed to the substrate to the solution; a reaction reagent is then mixed into the solution and the reaction reagent initiates a chemical reaction involving the precursor, thereby depositing the material onto the substrate surface. The process of U.S. Pat. No. 5,789,027 does not allow formation of nanoparticles on a support material, and the substrates employed in the examples are all of macroscale.

US 2004/137214 discloses a method of manufacturing a material with surface nanometer functional structure. The process comprises the steps of providing a substrate and placing it in a high-pressure container; supplying a supercritical fluid into the high-pressure container; tuning the temperature and pressure inside the high-pressure container to their appropriate values; supplying a precursor of a target material to be formed with a surface nanometer functional structure to the high-pressure container; and releasing the pressure inside the high-pressure container after the fluid therein reaches its reaction balance point, bringing the precursor to adhere on the substrate surface to form the surface nanometer functional structure.

WO 2006/080702 describes carbon nanotubes for a fuel cell and a nanocomposite including the carbon nanotubes. For example, a method of producing a nanocomposite for a fuel cell is disclosed, which method uses a supercritical $CO_2$ fluid deposition method, wherein a mesoporous carbon support is mixed with a precursor of a metallic catalyst and the mixture is reduced in a supercritical $CO_2$ fluid using hydrogen gas.

WO 2006/110822 provides processes for the preparation of a carbon aerogel supported catalyst, which may comprise metal particles having an average metal particle size of 2.5 nm or less. The structure of WO 2006/110822 may be prepared by contacting a support with a metal precursor dissolved in a supercritical fluid and reducing the metal precursor to a metallic state either by thermal reduction or hydrogen reduction at proper conditions.

The supercritical treatments of WO 2005/069955 and WO 2006/110822 are performed batchwise, which makes the synthesis troublesome to scale up for industrial purpose.

Furthermore, controlled high heating rates are problematic to obtain in batchwise synthesis, leading to an inhomogeneous heating, and hence the resulting particles may not be optimal for catalytic conversion processes.

As an alternative to batchwise processing Adschiri et al. (*J. Am. Ceram. Soc.*, 75: 2615-18, 1992) introduced the concept of production of particles in a continuous supercritical reactor. It is demonstrated how particles of AlOOH can be prepared from the precursor $Al(NO_3)_3$ in supercritical water. The reactor design of Adschiri et al. allowed continuous withdrawal of particles formed in the reactor. Adschiri et al. found that the temperature, pressure and precursor concentration had an effect on particle size and morphology. The particles of Adschiri et al. are, however, microsized.

Hald et al. (*Journal of Solid State Chemistry* 179: 2674-2680, 2006) disclose the production of $TiO_2$ nanoparticles in a continuous supercritical reactor. The particles are formed from a precursor of titaniumisopropoxide, which is reacted in a mixture of supercritical isopropanol and water (5%). Hald et al. show how homogeneous nanoparticles can be produced quickly due to the instantaneous formation of a large number of primary particles when the hot supercritical solvent meets the cold reactant. The nanoparticles of Hald et al. were generally in the range of 11 to 18 nm, and the particle size could be controlled by varying temperature and pressure.

Kimura et al. (*Colloids and Surfaces A: Physicochem. Eng. Aspects* 231: 131-141, 2003) disclose the preparation of platinum nanoparticles from a platinum precursor ($H_2PtCl_6.6H_2O$ and $Na_2PtCl_6.H_2O$) in sub- and supercritical solvents. The solvents employed were water, ethanol, and their mixtures. The process of Kimura et al. required the presence of poly(N-vinyl-2-pyrrolidone) (PVP) as a protective polymer. All solvents allowed formation of platinum nanoparticles, which in some cases agglomerated to larger structures. Ethanol generally served as a reducing agent, although when pure water was used as a solvent a reducing effect was provided by decomposition of PVP. When sub- and supercritical ethanol were employed as a solvent Kimura et al. found that the nanoparticles, which were of diameters of about 3 nm, tended to aggregate even to particles unable to pass a 50 μm filter. According to Kimura et al. optimal production of platinum nanoparticles was provided in a subcritical 1:1 mixture of ethanol and water with a large molar excess of PVP.

In light of the above there is a need for an improved method for providing catalytic structures with catalytic nanoparticles. It is an aim of the present invention to address this need.

DISCLOSURE OF THE INVENTION

The present invention relates to a method of preparing a catalytic structure, the method comprising the steps of:
providing a solution of a precursor compound in a solvent at ambient conditions;
providing a suspension of a support material having a specific surface area of at least 1 $m^2/g$ in a solvent at ambient conditions;
optionally sonicating the suspension of the support material;
mixing the solution of the precursor compound and the suspension of the support material;
providing a reactive solvent in a supercritical or subcritical state;
admixing the mixture of the solution of the precursor compound and the suspension of the support material in the supercritical or subcritical reactive solvent to form a reaction solution;
injecting the reaction solution into a reactor tube via an inlet
allowing a reaction of the precursor compound in the supercritical or subcritical reactive solvent in the reactor tube to form the catalyst nanoparticles on the support material to provide the catalytic structure; and
withdrawing the catalytic structure from the reactor tube via an outlet.

The method of the invention thus provides a catalytic structure, where the catalytic effect of the structure is provided by catalyst nanoparticles, e.g. of a metal in its metallic form or nanoparticles comprising a metal compound, deposited on a support material. The catalytic structure may be suitable for any catalytic process that can be catalysed via catalyst nanoparticles. In one embodiment the catalyst nanoparticles are of a metal in its metallic form. In another embodiment the catalyst nanoparticles comprise a metal compound, e.g. with a metal in an oxidised state. The catalyst nanoparticles are synthesised continuously in a supercritical or subcritical solvent, which gives excellent control of morphology, crystallinity, size and uniformity of the particles which are all important characteristics for catalytic properties of the nanoparticles. In particular, the present inventors have surprisingly found that the presence of a support material in the synthesis allows that the catalyst nanoparticles can be formed directly on the support material in the continuous process without agglomeration or precipitation of the formed particles. This further provides that the catalyst nanoparticles can be distributed evenly on the support material, and that the spacing of the nanoparticles can be controlled. In a certain embodiment the size of the catalyst nanoparticles is in the range of about 1 nm to about 50 nm, and the nanoparticles are preferably monodisperse. The catalytic structure can furthermore be prepared directly in a one-step reaction in the flow synthesis reactor so that the final catalytic structure can be withdrawn from the reactor requiring only a minimum of additional processing steps, e.g. to purify the catalytic structure. The method enables the use of environmentally friendly solvents in the continuous flow production of catalyst nanoparticles, and offers laboratory-like control while providing high throughput for larger productions and scalability for industrial application. The advantages of avoiding agglomeration also allow a more efficient process with an increased yield from the expensive starting materials.

The catalyst nanoparticles are particles in the nanosize range, e.g. from about 0.1 nm to about 1000 nm, although it is also contemplated that the particles may be larger than nanosize, e.g. the particles may be of microsize with a size within the range of about 1 μm to about 10 μm.

In one embodiment, the catalyst nanoparticles are metallic and may comprise any metal or mixture of metals known or expected to have a catalytic effect on a chemical reaction. Preferred metals for metallic catalyst nanoparticles are platinum, ruthenium, gadolinium and yttrium and mixtures of platinum and ruthenium, gadolinium and/or yttrium. In another embodiment the catalyst nanoparticles comprise a metal compound known or expected to have a catalytic effect on a chemical reaction. The catalyst nanoparticles may comprise any catalytic metal compound. Catalytic metal compounds typically comprise a metal atom, e.g. a transition metal or a lanthanide, in an oxidised state and a partner atom, e.g. an atom from groups 13 ("the boron group"), 14

("the carbon group"), 15 ("the nitrogen group") or 16 ("the oxygen group") of the periodic table of the elements or another ligand molecule, e.g. an organic ligand or an inorganic ligand. The partner atom or ligand will typically be in a reduced state. The catalytic metal compound may comprise more than one metal atom, e.g. in a trace amount, and the catalytic metal compound may comprise more than one partner atom or ligand.

The metal catalyst nanoparticles are formed from a precursor compound. When the catalyst nanoparticles are metallic, the precursor compound may be any metal salt or compound capable of forming a metal, i.e. a metal in its metallic form, following reaction, e.g. a reduction, in the reactive solvent. Preferred precursor compounds for providing metallic catalyst nanoparticles are $H_2PtCl_6.6H_2O$ platinum(II) acetylacetonate ($Pt(C_5H_7O_2)_2$) (also known as Pt(acac)$_2$), Ru(acac)$_3$ and RuCl$_3$. When the catalytic nanoparticles comprise a metallic compound the precursor compound may house the metal in a partly oxidised state and a partner atom in reduced state, e.g. fully reduced state, and further ligands or atoms corresponding to the difference in oxidation levels between the metal atom in its current and final states, e.g. $(NH_4)_2MoS_4$. Thus, an oxidation of the metal atom may provide the catalytic metal compound. The method of the invention may also employ more than one precursor compound. For example, the method may employ two or more metal precursors in order to provide metallic catalyst nanoparticles comprising the corresponding two or more metals. The method may also employ two or more precursor compounds for providing catalyst nanoparticles with two or more metal compounds. Alternatively, a single metal compound may be prepared from two precursor compounds where one contains the metal atom and the other contains the partner atom. It is likewise possible for the method to employ a mixture of one or more precursor compounds for providing metallic catalyst nanoparticles and one or more compounds for providing metal compound catalyst nanoparticles in order to provide catalyst nanoparticles comprising a mixture of a metal and a metal compound.

The support material may be any solid material of a high specific surface area, e.g. in one embodiment the specific surface area is at least 10 m$^2$/g, in particular when the support is a carbon material. However depending on the intended use of the catalytic structure the specific surface area may not be important. In some embodiments the specific surface area is below 100 m$^2$/g, e.g. from 1 to 10 m$^2$/g or less. The support materials should be insoluble in the solvents employed in the method of the invention, and the support material should also generally be insoluble under the conditions of the intended catalytic process. Likewise, the support material may be chemically inert in the method of the invention. In one embodiment a preferred support material is a carbon material, e.g. graphene, carbon nanotubes (CNT), carbon black or a carbon aerogel. Carbon materials are particularly preferred when an electron conducting support material is desired. In other embodiments the support material is not electron conducting, and the support material may be selected inter alia on the basis of electron conductivity. The selection of a support material for a specific catalytic structure is well-known to the skilled person.

In order to disperse the support material and optimise access to the large surface area of the support material, the method may comprise a step to improve the dispersion. Any technology allowing dispersion of a particulate material may be used. For example, the suspension of the support material may be sonicated. The sonication may be performed at any stage prior to or during the step of admixing the mixture of the solution of the precursor compound and the suspension of the support material in the supercritical or sub-critical reactive solvent. It is furthermore possible to improve dispersion by including a dispersion agent in the suspension of the support material and/or the reactive solvent. A preferred dispersion agent is ethylene glycol, e.g. at a concentration of 1%. For carbon based support materials, improved dispersion can be provided by activating the carbon support material, such as by treating, e.g. stirring, in HNO$_3$ of high concentration, e.g. 8 M, or H$_2$O$_2$, e.g. 2 M.

The method of the invention employs a solution of a precursor compound in a solvent at ambient conditions, and a suspension of a support material in a solvent also at ambient conditions. Any solvent that is liquid at ambient conditions may be used in the method, and the solvent for dissolving the precursor compound and the solvent for suspending the support material may be the same or different. In a certain embodiment the mixture of the solution of the precursor compound and the suspension of the support material is prepared directly, e.g. by dissolving the precursor compound and suspending the support material directly in the same solvent. The reactive solvent may also comprise another component, e.g. other solvents or dissolved components, for example to activate or enhance the activation of the support material or improve dispersion of the support material. For example, a carbon support material may be activated using 1 to 5% w/w of $H_2O$, $H_2O_2$, $H_2SO_4$, $HNO_3$ or a combination thereof. The component to activate the support may also be provided with either the solution of the precursor compound or the suspension of the support material. Activation of the support may improve the dispersion of the support material or the activation may improve formation of the catalyst nanoparticles on the support, e.g. by improving physical or chemical binding of the catalyst nanoparticles or by providing nucleation points for formation of catalyst nanoparticles.

The solvents are selected so as to be soluble in the reactive solvent under supercritical or subcritical conditions. The solvents are preferably the same and more preferably the same as the reactive solvent. The solubilities of solvents in super- and subcritical conditions are well-known to the skilled person. The concentrations of the precursor compound and the support material in the respective solvents may be chosen freely, although it is preferred that the concentrations of the precursor compound and the support material are in the range of about 1 wt % to about 10 wt %. The concentration may also be expressed in molar concentrations, and the concentration may be in the range of 0.001 to 10 M, e.g. at 1 M or 0.1 M, although concentrations outside these ranges are also contemplated.

Any reactive solvent allowing the precursor compound to form the appropriate catalyst compound, i.e. in the form of nanoparticles, when the reactive solvent is in a supercritical or subcritical state may be employed in the method of the invention, and the reaction may be any chemical reaction allowing formation of the catalyst nanoparticles. The reaction of the precursor compound in the reactive solvent may be a reduction of a metal ion to convert the metal ion to the metal in its metallic form. Preferred reducing reactive solvents are ethanol, methanol, isopropanol, ethylene glycol and combinations thereof. It is further contemplated that water may serve as a reducing solvent. When the precursor compound comprises a metal atom in a partly oxidised state the reactive solvent may be an oxidising reactive solvent.

The reactive solvent is in a supercritical or subcritical state when it is admixed with the mixture of the solution of the precursor compound and the suspension of the support material. For example, in one embodiment the reactive solvent has a temperature at or within 100° C. below, or above the temperature of the critical point ($T_{cr}$) of the reactive solvent and the reactive solvent is at a pressure at or within 30% below, or above the pressure of the critical point ($P_{cr}$) of the reactive solvent. When both the temperature and the pressure of the reactive solvent are above the respective values of the critical point the solvent is in a supercritical state. When either the temperature or the pressure of the reactive solvent are below the respective values of the critical point but within the indicated ranges the solvent is considered to be in a subcritical state. Both of the temperature and the pressure of the reactive solvent may also be below the respective values of the critical point but within the indicated values; this is also considered to be a subcritical state in the present invention.

The mixture of the solution of the precursor compound and the suspension of the support material may contain the precursor compound and the support material in any desired ratio. Likewise, the ratio of the precursor compound, the support material and the reactive solvent may also have any desired value. A preferred ratio of precursor compound: support material is 4:1. The mixture of the solution of the precursor compound and the suspension of the support material may be provided as a cold reaction line, e.g. at ambient conditions, which is mixed abruptly with the supercritical or sub-critical reactive solvent. Alternatively, the pressure and/or temperature of the mixture of the solution of the precursor compound and the suspension of the support material may also be increased prior to admixing with subcritical or supercritical solvent. For example, the mixture may be admixed with ethanol as a reactive solvent, which is preheated at a pressure of ~200 bar resulting in a mixing temperature of ~300° C. representing the supercritical regime of ethanol. In a specific embodiment, the reactive solvent is ethanol and the temperature is in the range of about 250° C. to about 400° C., and the pressure is in the range of about 100 bar to about 300 bar. The step of mixing the solution of the precursor compound and the suspension of the support material may be done before the step of admixing the mixture of the solution of the precursor compound and the suspension of the support material in the supercritical or subcritical reactive solvent, or the solution of the precursor compound and the suspension of the support material may be admixed simultaneously with the reactive solvent in a supercritical or subcritical state. Furthermore, either of the solution of the precursor compound or the suspension of the support material may be brought to sub- or supercritical conditions before admixing with the reactive solvent under sub- or supercritical conditions. High heating rates can be obtained by mixing the cold reaction line and the supercritical or subcritical solvent. The high heating rates can provide fast nucleation and reaction uniformity. In particular, the rapid increase in the temperature leads to fast homogenous nucleation resulting in monodisperse nanoparticles, which are further matured in the heater before being cooled down. The critical temperature and pressure are solvent dependent, and hence tuneable by using different reactive solvents, e.g. in a pure form or as a mixture of solvents. The obtained product, i.e. the catalyst nanoparticles, is tuneable by varying temperature and pressure, thus controllability of morphology, crystallinity, size, and uniformity of the particles are obtained. This results in homogenous nanoparticles with a narrow, e.g. monodisperse, size distribution, which is crucial for catalytic property of nanoparticles. The temperature and pressure of the reactive solvent may be controlled and varied throughout the process. For example, the reactive solvent may be at one set of temperature and pressure upon admixing with the mixture of the solution of the precursor compound and the suspension of the support material, and subsequently the temperature and pressure may be increased or decreased in the reactor tube. The support material that is present in the super- or sub-critical media prevents the catalyst nanoparticles from agglomerating, as these attach directly onto the support material.

The method of the invention is performed in a reactor tube so that the reaction can be described as a continuous process, e.g. the reaction takes place under continuous conditions. Operation under continuous conditions in a reactor tube provides advantages that cannot be realised in a batch type operation. For example, the continuous operation allows that relatively small portions of the mixture of the solution of the precursor compound and the suspension of the support material at a time are admixed with the super- or subcritical reactive solvent ensuring a fast and efficient change from ambient conditions to super- or subcritical conditions at which the catalyst nanoparticles will form. This allows good control of the size and uniformity of the nanoparticles, and furthermore it allows that the nanoparticle distribution on the support material is controlled. In one embodiment the catalyst nanoparticles are formed on the support material at a spacing between the catalyst nanoparticles which is in the range on about 0.1 nm to about 100 nm. The combined control of size, uniformity and distribution on the support material cannot be achieved in a batch process.

The reactor tube has an inlet and an outlet. The step of admixing the mixture of the solution of the precursor compound and the suspension of the support material in the supercritical or subcritical reactive solvent in a reactor tube may thus be performed at the inlet of the reactor tube, e.g. in an injector or a mixing chamber, and the catalytic structure may be withdrawn from the reactor tube at an outlet, so that the admixture, or "reaction solution", will travel through the reactor tube from the inlet to the outlet. For example, the admixture may travel down a vertical reactor tube. It is preferred that the reactor tube is vertical with the inlet at an upper section of the reactor tube and the outlet at a lower section of the reactor tube, so that the outlet is below the inlet. In another embodiment the inlet may also be below the outlet so that the admixture travels upward in the reactor tube. In other embodiments the reactor tube comprises one or more additional inlets downstream of the first inlet. This allows for a more flexible process, since for example it is possible to supply the reaction solution with further precursor compounds allowing the formation of catalyst nanoparticles having a layered structure of different metals.

The reactor set-up may comprise a mixing chamber or the inlet tubes may contain a static mixer to improve mixing. For example, the solution of the precursor compound and the suspension of the support material may be mixed using a static mixer prior to admixing with the reactive solvent. Likewise, the step of admixing the mixture of the solution of the precursor compound and the suspension of the support material in the supercritical or subcritical reactive solvent may be performed using a static mixer. Static mixers are well-known to the skilled person. The step of admixing the mixture of the solution of the precursor compound and the suspension of the support material in the supercritical or subcritical reactive solvent may also be performed using cross-, vortex- or opposing flow-mixing.

The distance between the inlet and the outlet coupled with the flow rate of the admixture in the reactor tube provides a residence time for the admixture flowing through the reactor tube. The residence time in the reactor tube allows that the particles are matured further to enhance crystallinity, thereby generating more well-defined particles. The fluid may be kept at supercritical or subcritical temperatures in the progress through the reactor tube, ensuring that all precursors may be used up. This provides better control of the process than is achievable in a batch process. A preferred residence time is in the range of about 2 seconds to about 10 seconds. However, the residence time is generally dependent on the scale of operation, and the residence time may also be shorter than 2 seconds or higher than 10 seconds. For example, the residence time may be 1 minute or more, such as 10 minutes or more. It is noted that the flow of the reaction solution in the reactor tube may also be stopped, so that the flow can be described as a stop-flow-operation; the flow does not need to be constant, and the flow-rate may be varied as desired.

The reaction solution of the mixture of the solution of the precursor compound and the suspension of the support material in the supercritical or subcritical reactive solvent may be cooled to liquefy the reaction solution. The cooling may be performed at any stage in the process after formation of the catalyst nanoparticles on the support material, and the reactor tube may comprise a cooling section between the inlet and the outlet. The cooling may, e.g. be obtained indirectly by flowing water on the outside of the reaction tube to a temperature where the reaction solution liquefies. For example, the reaction solution may be exposed to a rapid cooling right before the exit via the outlet of the reactor tube. The reactant or precursor inlets may also comprise a cooled section, e.g. to prevent premature heating of the precursor compound. The pressure of the reactor tube may be relieved by a valve (Pressure release valve or back pressure regulator), and the reaction solution, including the catalyst nanoparticles synthesised directly onto the support material, can be continuously withdrawn or tapped.

The features of the embodiments described above may be combined freely as desired, and embodiments from such combinations are also considered within the scope of the invention.

In another aspect the invention relates to a catalytic structure obtainable in the method of the invention, preferably a catalytic structure comprising platinum or platinum-ruthenium nanoparticles formed on a carbon support material, e.g. graphene, CNT's or carbon black. This catalytic structure is suitable for a fuel cell, and in yet a further aspect the invention relates to a fuel cell comprising a catalytic structure obtainable in the method of the invention. The fuel cell may be a direct alcohol fuel cell, preferably a methanol or ethanol fuel cell, and the catalytic structure preferably comprises platinum or platinum-ruthenium nanoparticles formed on a carbon support material, e.g. graphene, CNT's or carbon black. However, the fuel cell may also be a HTPEM, LTPEM, DFAFC, MCFC, Reformed methanol fuel cell, Phosphoric acid fuel cell.

BRIEF DESCRIPTION OF THE FIGURES

In the following the invention will be explained in greater detail with the aid of an example and with reference to the figures, in which.

DETAILED DESCRIPTION OF THE INVENTION

Figure 1A:
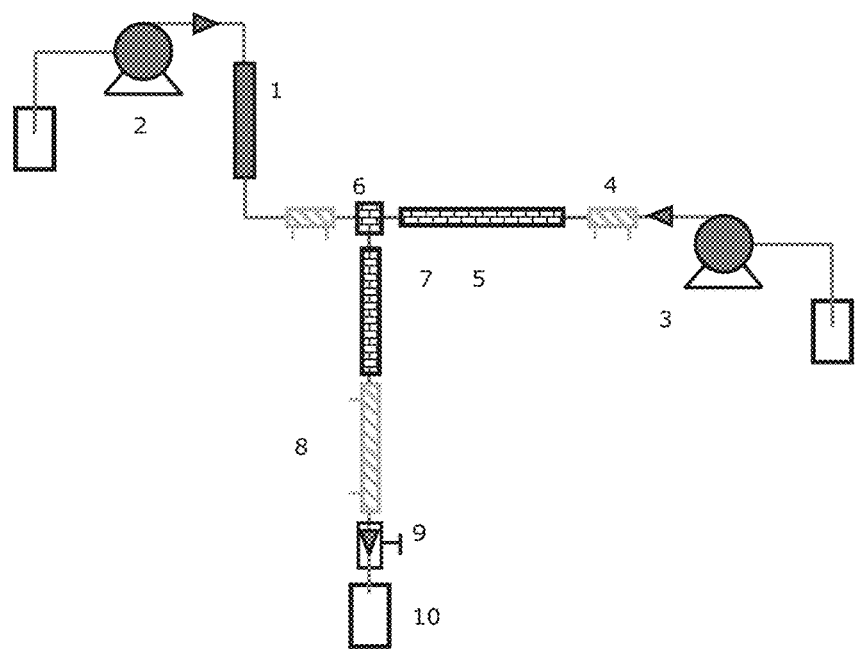
FIG. 1a shows a schematic drawing of a continuous supercritical reactor set-up.

The present invention relates to a method of providing a solution of a precursor compound in a solvent at ambient conditions;

providing a suspension of a support material having a specific surface area of at least 1 m$^2$/g in a solvent at ambient conditions;

optionally sonicating the suspension of the support material;

mixing the solution of the precursor compound and the suspension of the support material;

providing a reactive solvent in a supercritical or subcritical state;

admixing the mixture of the solution of the precursor compound and the suspension of the support material in the supercritical or subcritical reactive solvent to form a reaction solution;

injecting the reaction solution into a reactor tube via an inlet allowing a reaction of the precursor compound in the supercritical or subcritical reactive solvent in the reactor tube to form the catalyst nanoparticles on the support material to provide the catalytic structure; and withdrawing the catalytic structure from the reactor tube via an outlet.

In the context of the invention a "catalytic structure" comprises a support material with catalyst nanoparticles, which particles may catalyse a desired reaction. In one embodiment the catalyst nanoparticles are metallic. Any catalytic metal may be relevant for the catalytic structure, in particular transition metals. The metal may also be a mixture of two or more metals. The metal or mixture of metals may be selected based on the reaction to be catalysed using the catalytic structure. For example, the catalyst nanoparticles may be platinum particles or platinum-ruthenium nanoparticles when the catalytic structure is used in a direct alcohol fuel cell (DAFC). In general, metals of relevance comprise a transition metal, a lanthanide, Sc, Ti, V, Cr, Mn, Fe, Co, Ni, Cu, Zn, Gd, Y, Zr, Nb, Mo, Ru, Rh, Pd, Ag, Cd, Pt, Au, Ir, W, Sr. The metal may also be a mixture of two or more metals, such as $Pt_xRu_y$, $Pt_xY_y$, $Pt_xGd_y$, $Pt_xSc_y$, $Pt_xTi_y$, $Pd_xTi_y$, $Pd_xY_y$, $Pt_xNb_y$, $Pt_xZn_y$, $Pt_xV_y$, $Pt_xCd_y$, $Pd_xCd_y$, $Pt_xCu_y$, $Pd_xCu_y$, $Pd_xNb_y$, $Pd_xV_y$, $Pt_xMo_y$, $Pt_xFe_y$, $Pt_xCr_y$, $Pd_xCr_y$, $Pt_xNi_y$, $Pt_xCo_y$, $Pd_xNi_y$, $Pd_xCo_y$, $Pt_xMn_y$, $Pt_xRh_y$, $Pt_xIr_y$, $Pt_xRu_yMo_z$, $Pt_xRu_yW_z$, $Pt_xRu_yCo_z$, $Pt_xRu_yFe_z$, $Pt_xRu_yNi_z$, $Pt_xRu_yCu_z$, $Pt_xRu_ySn_z$, $Pt_xRu_yAu_z$, $Pt_xRu_yAg_z$, $Pd_xRu_y$. When two or more metals are employed the ratio between the metals, i.e. as represented by x and y and z in the listed combinations of metals, may be selected freely. For example, one embodiment of the invention provides platinum-ruthenium nanoparticles where platinum and ruthenium are in the ratio of about 1:1.

In another embodiment the catalyst nanoparticles comprise a catalytic metal compound, e.g. a metal compound comprising a metal atom in an oxidised state and a partner atom or ligand molecule. The metal is preferably a transition metal. Partner atoms may be boron (B), carbon (C), silicon (Si), germanium (Ge), nitrogen (N), phosphorus (P), arsenic (As), antimony (Sb), oxygen (O), sulfur (S), selenium (Se), or tellurium (Te). Halogen partner atoms are also contemplated in the invention. Exemplary catalytic oxides comprise MgO, $Co_xO_y$, $Fe_xO_y$, $Fe_2O_3/NiO$, $Y_xFe_yO_z$, $FeTiO_3$, $CuFe_2O_4$, $ZnFe_2O_4$, $ZrFe_2$, $CuZnFe_4O_4$, $Zr_4Sc_1Fe_{10}$, $TiO_2$, $CeO_2$, $ZrO_2$, and the catalytic nanoparticles may comprise any of these materials. Further catalytic metal compounds are $Mo_xS_y$, $CoS_x$—$MoS_2$, $Fe_{1-x}S_x$ (x=0-0.125), $Ni(Co)Mo_{1-x}W_xS_2$ and all these metal compounds are relevant for the invention. The invention is not limited to these metal compounds and others are known to the skilled person.

The catalyst nanoparticles may also comprise a mixture of a metal in its metallic form and a metal compound; the mixture may be random or the catalyst nanoparticles may comprise layers, e.g. distinct layers, of a metal and a metal compound. Layered catalyst nanoparticles may be prepared by initially forming a core particle and subsequently adding, e.g. via an inlet downstream in the reactor tube of the first inlet, a second, different precursor compound to the super- or subcritical reactive solvent and allowing the second precursor to react in the presence of the core catalyst nanoparticles. When the catalyst nanoparticles comprise more than one metal or more than one metal compound the catalyst nanoparticles may contain a first metal or metal compound representing the majority, e.g. more than 90% w/w, more than 95% w/w or more than 99% w/w, of the mass of the catalyst nanoparticle and one or more minor components, e.g. a metal or a metal compound, present in e.g. less than 10% w/w, less than 5% w/w or less than 1% w/w, of the mass of the catalyst nanoparticle. In this case the catalyst nanoparticle can be said to be "doped" with the minor component. Doped catalysts and the relative amount of their components are well-known to the skilled person.

The catalytic structure prepared in the method of the invention comprises catalyst nanoparticles formed on the support material. In the context of the invention a "nanoparticle" is a particle smaller than 1 µm, e.g. in the range of about 0.1 nm to about 1000 nm, with the ranges of from about 1 nm to about 100 nm, or 3 nm to 50 nm, being preferred. Other preferred ranges are from about 1 nm to about 10 nm, e.g. about 1 nm to about 5 nm. The nanoparticles formed in the method may be monodisperse having a narrow size distribution; samples of particles with standard deviations up to 50%, e.g. <40%, <30%, <20%, <10%, e.g. <5%, in diameter are considered monodisperse. For example, according to one embodiment of the invention the nanoparticles are of about 5 nm or about 6 nm in size with the standard deviation of the particle size of one batch of nanoparticles being within 50% of 5 nm or 6 nm respectively. It is noted, however, that the smaller the nanoparticles, the larger the acceptable variation of the diameters for the nanoparticles to be considered monodisperse. It is further noted that the size of the catalyst nanoparticles is generally not dependent on the support material, e.g. the specific surface area of the support material. For example, the size of the catalyst nanoparticles can be controlled via the temperature and control of the reaction solution. However, the support surface can also affect the catalyst particle size.

The "support material" is a solid material, which may be inert regarding the reaction to be catalysed by the catalytic structure, and which has a high specific surface area allowing a high mass transfer rate in the catalysed reaction. Thus, the support material may have a specific surface area of at least 100 m$^2$/g, although it is preferred that the specific surface area is at least 250 m$^2$/g, 500 m$^2$/g, 1000 m$^2$/g, 1500 m$^2$/g, 2000 m$^2$/g, at least 2500 m$^2$/g, or at least 3500 m$^2$/g. In a specific embodiment the specific surface area is in the range of 10 m$^2$/g to 3500 m$^2$/g, e.g. about 50 m$^2$/g to about 1500 m$^2$/g, about 100 m$^2$/g to about 1000 m$^2$/g. In general the higher the specific surface area the higher the mass transfer rate provided by the catalytic structure. Materials with specific surface areas relevant to the invention may be porous, or the high specific surface area may be due to the support material being present in an appropriately sized particulate form, or the specific surface area may be due to a combination of particle size and porosity of the support material. Determination of the specific surface area is well known to the skilled person. In specific embodiments it is possible to modify the surface of the support, e.g. to modify the hydrophilicity or hydrophobicity. For example a support material may be exposed to reducing or oxidising conditions prior to the reaction in which the catalyst nanoparticles are formed. For example, graphene oxide may be subjected to reducing conditions to provide reduced graphene oxide. In particular, the reactive solvent may comprise a component to activate the support material.

Preferred support materials, especially when the catalytic structure should have electron conductive properties, are carbon materials, such as graphene, graphene oxide, reduced graphene oxide, carbon nanotubes (CNT), e.g. single-walled or multi-walled CNT's, bucky balls, carbon particles, carbon black, e.g. Vulcan XC-72 and 72R from CABOT and KetjenBlack from Akzo Nobel; aerogels; ceramic materials; metals; metal alloys, zeolites, tungsten carbide, metal oxides such as $Al_2O_3$, γ-AlO(OH), $TiO_2$, MgO, $La_2O_3$, $ZrO_2$, $SiO_2$, $SiO_2$—$Al_2O_3$, $SO_4^{2-}$—$ZrO_2$, $CeO_2$, ZnO, $IrO_2$, $Cr_2O_3$, $MgAl_2O_4$, $BaSO_4$, $CaCO_3$, $SrCO_3$ etc. The support material may be selected based on desired characteristics of the catalytic structure prepared. For example, when the catalytic structure is an electrode material for a fuel cell the support material preferably has high electrical conductivity. The specific surface areas of exemplary carbon support materials are up to 250 m$^2$/g for carbon black, about 250 to about 1250 m$^2$/g for CNT's (e.g. single-walled) and >2,000 m$^2$/g for graphene. Certain carbon black materials may also have specific surface areas outside these typical ranges, for example Akzo Nobel provides carbon black materials of about 1400 m$^2$/g (KetjenBlack EC-600JD) and about 800 m$^2$/g (Ketjenblack EC-300J). Other relevant support materials are any materials conventionally used in the field of heterogeneous catalysis, as are known to the skilled person. Exemplary support materials comprise ceramic materials, such as alumina, titania, silica, zirconia, metal oxides, metal sulphides or metals.

The support material is provided as a suspension, which is mixed with the solution of the precursor compound. This should be understood broadly, and it is also contemplated that the support material and the precursor compound, e.g. in a dry form, are added to a solvent to suspend the support material and dissolve the precursor compound in order to provide the mixture of the solution of the precursor compound and the suspension of the support material. Thus, a specific embodiment of the method of the invention comprises the step of providing a suspension of a support material in a solvent at ambient conditions, which suspension contains a precursor compound. Likewise, the support material, e.g. in a dry form, may be added to a solution of the precursor compound, or the precursor compound, e.g. in a dry form, may be added to a suspension of the support material in order to provide the mixture of the solution of the precursor compound and the suspension of the support material.

The catalytic structure provided in the method of the invention has catalyst nanoparticles providing the catalytic function of the catalytic structure. The support material may also provide effects to the catalytic structure. For example, a reduced graphene oxide support may make the catalytic effect resistant to CO-poisoning when the catalytic structure comprises platinum nanoparticles. The catalyst nanoparticles are prepared from a "precursor compound". The precursor compound may be any metal salt or compound capable of forming a metal in its metallic form, or the precursor compound may allow formation of a catalytic metal compound comprising a metal atom in an oxidised state and a partner atom or ligand In general, the same precursor compounds may be employed to form either metallic catalyst nanoparticles of catalyst nanoparticles comprising a metal compound; the choice of reactive solvent allows control of the final oxidation state of the metal component in the catalyst nanoparticles, e.g. if the metal component will be at oxidation level 0, i.e. metallic, in the catalyst nanoparticles, or if the metal component will be at a higher oxidation level to form a metal compound. It is preferred that the precursor compound is soluble in a solvent, and it is further preferred that the dissolved form of the precursor compound provides a solubilised metal ion or a metal ion solubilised as a complex with one or more partner atoms or ligands. For example, hexachloroplatinate may be used as a precursor compound for forming metallic platinum. The partner atom or ligand may be any molecule that can form a complex with the metal ion, and in particular the partner atom or ligand may be a molecule that can stabilise the metal ion, e.g. prevent spontaneous oxidation or reduction, and aid in solubilising the metal ion. The molecule may be a simple ion, e.g. chloride, or an organic compound or ion. The precursor compound may also be an organometallic compound containing a bond between a carbon atom and the metal atom. The partner atom or ligand may also be a molecule, which will form part of the catalyst nanoparticles. For example, MoS$_4^{2-}$ may be employed as a complex of molybdenum to form catalyst nanoparticles of MoS$_2$. In one embodiment the precursor compound comprises a metal atom in an oxidised form, which may be reduced to form the metallic nanoparticles. In another embodiment the precursor compound comprises a metal atom in a partly oxidised form, which may be oxidised to form catalyst nanoparticles together with one or more partner atoms or ligands. Alternatively, the precursor compound comprises a metal atom in a more, e.g. fully, oxidised form, which may be reduced to form catalyst nanoparticles together with one or more partner atoms or ligands. Exemplary precursor compounds comprise A$_3$[VS$_4$], A$_3$[NbS$_4$], A$_3$[TaS$_4$], A$_2$[MoSe$_4$], A$_2$[WS$_4$], A$_2$[WSe$_4$], A[ReS$_4$], where A may be an alkali metal cation, [PPh$_4$]$^+$, [NEt$_4$]$^+$ ammonium or the like.

Certain embodiments of the method of the invention employ more than one precursor compound, which may be provided in a single solution, or individual precursor compounds may be provided as separate solutions, which may be mixed prior to or simultaneously with the mixing with the suspension of the support material. When multiple precursor compounds are employed the ratio between the metal ions, e.g. expressed in terms of mass or molarity, may be chosen freely. In one embodiment the precursor compound is H$_2$PtCl$_6$.6H$_2$O, Pt(acac)$_2$, Ru(acac)$_3$ or RuCl$_3$ or a combination thereof is employed. These precursor compounds allow formation of metallic platinum and ruthenium, respectively. These compounds are soluble in an appropriate solvent, e.g. ethanol or water or a mixture of ethanol and water, to prepare solutions that can be mixed with the reactive solvent in a supercritical or sub-critical reactive solvent.

The ratio of the precursor compound to the support material, e.g. expressed as the mass of the metal component of the precursor compound to the mass of the support material, may in the range of about 1:100 to about 100:1, e.g. about 1:10 to about 10:1, about 1:5 to about 5:1, about 1:3 to about 3:1, about 1:2 to about 2:1 or about 1:1. Preferred ratios in embodiments where metallic platinum or ruthenium are prepared on carbon support materials are 5% w/w to 50% w/w of carbon support to platinum or ruthenium; in particular about 20% w/w, e.g. of platinum to graphene, will give superior results for a catalyst structure regarding performance as an electrode for a fuel cell. The concentrations of the precursor compound and the support material in their respective solvents is preferably in the range of about 1 wt % to about 10 wt %, or 0.001 to 1 M, e.g. 0.1 M. The volumes of the solution of the precursor compound and the suspension of the support material are selected to provide the desired ratio of the precursor compound and the support material depending on their respective concentrations. It is, however, preferred that the volumes are of comparable size in order to ensure efficient mixing, and the concentrations will generally be selected to allow mixing of volumes of comparable size.

The method of the invention comprises steps where solvents are under "ambient conditions". In the context of the invention the term "ambient" should be understood broadly and in particular it means that the pressure is not increased or decreased relative to the pressure of the surroundings. The solvent under ambient conditions will be liquid, and for certain solvents the temperature may be decreased or increased relative to the temperature of the surroundings, in particular in order to ensure that the solvent is in a liquid state.

In terms of the present invention a "reactive solvent" is a solvent that may form a supercritical or subcritical state, and which further comprises a reactive compound that may react with a precursor compound to form a metal or a metal compound. In certain embodiments it is, however, also possible for the reaction to be caused by a thermal activation of the precursor compound, which e.g. comprises a complex of a metal atom in oxidation level 0, such as iron (0) pentacarbonyl ($Fe(CO)_5$). In this case the support material may serve as a nucleation point for the reaction of the precursor compounds, which thus does not require a reactive compound from the sub- or supercritical solvent. The sub- or supercritical solvent is however still considered a "reactive solvent" in terms of the invention. The reactive solvent is preferably liquid at ambient conditions. It is however also contemplated that gaseous compounds, e.g. $CO_2$, may be employed as a supercritical solvent in the method of the invention. The reaction may be a reduction or an oxidation, or a thermal activation, and the reactive compound may be molecules of the reactive solvent or the reactive solvent may comprise further, e.g. dissolved, reducing or oxidising compounds. When the molecules of the reactive solvent are themselves reducing the reactive solvent may be referred to as a "reducing solvent". Likewise, if the reactive solvent comprises oxidising solvent molecules the reactive solvent may be referred to as an "oxidising solvent". The reactive solvent may be selected from alcohols, ethers, ketones, aldehydes, amines, amides, water and other organic based liquids; preferred reactive solvents are ethanol, methanol, isopropanol, ethylene glycol, water and combinations thereof. Alcohols, e.g. ethanol, methanol and isopropanol, ethylene glycol are generally considered reducing solvents. Oxidising solvents comprise hydrogen peroxide, nitric acid and water, or an oxidising compound, such as $KMnO_4$, $RuO_4$, $HNO_3$, $H_2SO_4$, $OsO_4$, may be contained in the reactive solvents. It is noted that certain oxidising compounds comprise metal ions that may also be relevant for the catalytic nanoparticles and may therefore also represent a precursor compound. Thus, in certain embodiments the precursor compound also provides an oxidising effect. This is particularly relevant when two or more precursor compounds are required to provide the desired catalytic nanoparticles. The reactive solvent may also comprise a mixture of solvents, including reducing solvents with non-reducing solvents or oxidising solvents with non-oxidising solvents. A reducing solvent may be employed to reduce an oxidised metal component of a precursor compound to the metal in its metallic form. An oxidising solvent may be employed to oxidise a partly oxidised metal component of a precursor compound to a more, e.g. fully, oxidised metal in order to provide catalyst nanoparticles of a metal compound comprising the oxidised metal and one or more partner atoms or ligands. Likewise, reducing solvent may be employed to reduce an oxidised metal component of a precursor compound to the metal at a lower oxidation level; such reactions may also provide catalyst nanoparticles of a metal compound comprising an oxidised metal and one or more partner atoms or ligands. Yet a further embodiment uses two or more different precursor compounds wherein an oxidised metal atom in one precursor compound can reduce an oxidised metal atom of another precursor compound. Likewise, ligands of the precursor compounds may also provide a reducing or oxidising effect. Furthermore, certain solvents may be either reducing or oxidising depending on the conditions, e.g. regarding pressure and temperature.

In a certain embodiment, the suspension of the support material and/or the reactive solvent may also comprise a dispersion agent. In the context of the invention a "dispersion agent" is any compound that may aid in the dispersion of the support material and it may further improve the processing by minimising undesirable deposition of the support or prepared catalyst in unit operations, such as valves, pumps, mixers, inlets, outlets etc. in the process stream. This is especially advantageous when the process is operating continuously since it allows the process to proceed for extended periods of time. A preferred dispersion agent is ethylene glycol, for example present at a concentration in the range of from about 0.1% to 10%, e.g. such as about 1%, about 2%, about 3%, about 4%, about 5%. Ethylene glycol is particularly advantageous as a dispersion agent when the reactive solvent is a reducing solvent, such as an alcohol, e.g. ethanol. Other dispersion agents comprise any non-ionic surfactant, e.g. Triton X-100, or polymeric compounds, such as polyvinyl pyrrolidone, polyoxyethylene sorbitan monolaurate etc.

Solvents generally have a critical point regarding temperature and pressure defining a supercritical regime, which is reached when exceeding the critical point in the phase diagram. The temperature value and the pressure value of the critical point are abbreviated "$T_{cr}$" and "$P_{cr}$", respectively, in the context of this invention. In the supercritical regime distinct liquid and gas phases do not exist, and in this regime the fluid will have special properties which have many advantages for the synthesis of catalyst nanoparticles. Compared to conventional liquid solvents, the high diffusivities and low viscosities of supercritical or subcritical fluids result in enhanced mass-transfer. The low surface tension of supercritical or subcritical fluids can also help avoiding collapse of the support material. The present inventors have now surprisingly found that this allows that the high specific surface area of the support material is efficiently made available for nucleation of catalyst nanoparticles so that aggregation of formed nanoparticles can be avoided and the catalyst nanoparticles can be distributed, as individual catalyst nanoparticles, on the support material to form a catalytic structure. The properties of supercritical and subcritical fluids are tuneable by changing the pressure and temperature. In particular, density and viscosity change drastically at conditions close to the critical point, e.g. at a temperature at or within 100° C. below $T_{cr}$ and a pressure at or within 30% below $P_{cr}$. There are generally no upper limits to the temperature and pressure in the method of the invention. However, it is contemplated that the temperature should generally be below 1000° C. and the pressure generally be below 1000 bar. In certain embodiments the upper limit of the temperature is within 500° C., within 200° C. or within 100° C. above the $T_{cr}$, and the pressure has an upper limit of 2000%, 1000%, 500% or 200% of the $P_{cr}$.

In the context of the invention the terms "supercritical" or "supercritical state" refer to the state of a solvent above its critical point regarding temperature ($T_{cr}$) and pressure ($P_{cr}$). The reactive solvent may also be in a subcritical state. The term "subcritical state" generally refers to the state where one or both of the temperature and the pressure are below the critical point values $T_{cr}$ and $P_{cr}$. In particular, in the context of the invention a sub-critical state may be formed when a solvent is exposed to a temperature at or within 100° C., e.g within 50° C., e.g. within 40° C., 30° C., 20° C. or 10° C., below the $T_{cr}$ while the pressure is at or within 30%, e.g. within 25%, 20%, 15%, 10%, or 5%, below the $P_{cr}$. When either of the pressure or the temperature is within these ranges and the temperature or the pressure, respectively, is above the corresponding critical point value the solvent is also considered to be in a subcritical state. The super- and subcritical states may also be referred to as super- and subcritical conditions, respectively. In certain embodiments the state of the reaction solution may be changed between supercritical conditions and subcritical conditions and vice versa. When the supercritical or subcritical reactive solvent is admixed with the mixture of the solution of the precursor compound and the suspension of the support material being under ambient conditions the temperature and pressure of the admixture will typically drop relative to the temperature and pressure of the reactive solvent due to ambient conditions of the mixture of the solution of the precursor compound and the suspension of the support material. However, due to the design of the apparatus the temperature and pressure of the reaction solution are quickly increased to the desired values. This allows that the initiation of the reaction of the precursor compound can be controlled further. As an example ethanol at a temperature in the range of 250° C. to 400° C. at a pressure of 100 bar to 300 bar is mixed with the mixture of the solution of the precursor compound and the suspension of the support material providing a temperature at the mixing point in the range of about 100° C. to about 325° C. In other embodiments, the pressure and/or temperature of the mixture of the solution of the precursor compound and the suspension of the support material is increased, e.g. to subcritical or supercritical conditions, in particular to the same pressure and temperature as the reactive solvent, prior to admixing with the reactive solvent under subcritical or supercritical conditions.

The temperature and pressure values of the critical points of solvents are known to the skilled person. Specific examples of critical points of selected solvents are given in Table 1.

TABLE 1

Critical points of selected solvents

| Solvent | Formula | Critical temperature (° C.) | Critical pressure (MPa) |
|---|---|---|---|
| Water | $H_2O$ | 374 | 22.1 |
| Ethanol | $C_2H_5OH$ | 241 | 6.14 |
| Methanol | $CH_3OH$ | 240 | 8.09 |
| Isopropanol | $C_3H_7OH$ | 235 | 4.76 |
| Acetone | $C_3H_6O$ | 235 | 4.7 |
| Diethylether | $(C_2H_5)_2O$ | 194 | 3.68 |
| Carbon dioxide | $CO_2$ | 31 | 7.38 |

Table 2 provides examples of relevant catalyst nanoparticles and relevant support materials; Table 2 further provides relevant applications for catalytic structures with the specified catalyst nanoparticles.

TABLE 2

Exemplary catalysts and relevant supports

| Catalyst nanoparticle | Support example* | Reaction |
|---|---|---|
| Ni | $MgAl_2O_4$ ($10\text{-}100\ m^2/g$) | $CH_2=CH_2 + H_2 \rightarrow CH_3CH_3$ $CH_4 + H_2O \rightarrow CO + 3\ H_2$ |
| Pt/Pd/Rh | | $2\ CO + 2\ NO \rightarrow 2\ CO_2 + N_2$ |
| $V_2O_5$ | | $SO_2 + \frac{1}{2}O_2 \rightarrow SO_3$ |
| $ZnO\text{—}Cr_2O_3$ | $Al_2O_3$ or $Cr_2O_3$ | $CO + 2\ H_2 \rightarrow CH_3OH$ |
| Cu/ZnO | | $CO_2 + 3\ H_2 \rightarrow CH_3OH + H_2O$ |

TABLE 2-continued

Exemplary catalysts and relevant supports

| Catalyst nanoparticle | Support example* | Reaction |
|---|---|---|
| $Mn_xO_y$ | | $H_2O_2 \rightarrow H_2O$ and $\frac{1}{2}O_2$ |
| Fe/Ru | | $N_2 + 3\ H_2 \rightarrow 2\ NH_3$ (Haber Process) |
| $Ni_xO_y$ | | Natural gas $\rightarrow$ Methane |
| $TiO_2$ | | Photocatalytic activity |
| Ru | | $CO \rightarrow CO_2$ |
| $MoS_2$ | | Hydrogen evolution reaction |
| Co/Fe/Ru/Ni | | $(2n + 1)\ H_2 + n\ CO \rightarrow C_nH_{(2n+2)} + n\ H_2O$ (Fischer-Tropsch reaction) |
| $Pt/Pt_xRU_y$ $Pt_xSn_y/Ru_xSe_yO_z$ | Carbon | Fuel cells (e.g. DMFC) |
| Co—Mo | | CO decomposition at 700° C. |
| $Cu_8Zn_5Al_2$ | ZMS-5 | Cu—Zn—Al catalyst with high selectivity for hydrogen production through Steam Reforming (Avoiding CO poisoning) |
| $Cu_{67}Zn_{57}Al_{27}$ | Zeolite | |
| $Cu_6Zn_7Al_2$ | | |
| $Cu_6Zn_5Al_4$ | | |
| $Cu_{53}Zn_{63}Al_{33}$ | | |
| $Cu_{47}Zn_{77}Al_{27}$ | | |
| $C_{47}Zn_{57}Al_{47}$ | | |
| $Cu_4Zn_9Al_2$ | | |
| $Cu_4Zn_7Al_4$ | | |
| $Cu_4Zn_5Al_6$ | | |
| $Cr_xO_y$ | $Al_2O_3$ ($100\ m^2/g$) | $C_4H_{10} \rightarrow C_4H_8 + H_2$ |
| $Ni_xMO_ySz$ $Co_xMO_ySz$ | $Al_2O_3$ ($200\text{-}300\ m^2/g$) | $C_4H_4S + 4H_2 \rightarrow C_4H_{10} + H_2S$ |
| Pd or Ni | Carbon | Hydrogenation |

*Typical specific surface area for the indicated support is given in parantheses Relevant precursor compounds containing platinum are $H_2PtCl_6.6H_2O$, $H_2PtCl_6.xH_2O$, $PtCl_2$, $PtCl_4$, $PtO_2$, cis-dichlorobis(pyridine)platinum(II), platinum(II) acetylacetonate ($Pt(C_5H_7O_2)_2$) (also known as $Pt(acac)_2$), $PtBr_2$, $PtI_2$, dichloro(ethylenediamine)platinum(II) ($H_2NCH_2CH_2NH_2$) $PtCl_2$), transplatinum(II)diammine dichloride ($Pt(NH_3)_2Cl_2$), platinum(IV) oxide hydrate ($PtO_2.xH_2O$), ammonium hexachloroplatinate(IV) (($NH_4)_2PtCl_6$), potassium hexachloroplatinate(IV) ($K_2PtCl_6$). Relevant precursor compounds containing ruthenium are $RuCl_3$, $Ru(acac)_3$, ruthenium(III) chloride hydrate ($RuCl_3.xH_2O$), ruthenium iodide ($RuI_3$), ruthenium(IV) oxide hydrate ($RuO_2.xH_2O$), ruthenium(III) bromide ($RuBr_3$), hexaammine ruthenium(II) chloride ($[Ru(NH_3)_6]Cl_2$). Relevant precursor compounds containing palladium are Palladium(II) acetate $Pd(OAc)_2$, $Pd(NO_3)_2$, $PdCl_2$, $Na_2PdCl_4$, (Ethylenediamine)palladium (II) chloride ($Pd(H_2NCH_2CH_2NH_2)Cl_2$), Palladium(II) iodide ($PdI_2$), Palladium(II) bromide ($PdBr_2$), PdO, $OPd.xH_2O$, $Pd(OH)_2$, $Pd(OH)_4$, Palladium(II) nitrate dihydrate ($Pd(NO_3)_2.2H_2O$), Palladium(II) nitrate hydrate ($Pd(NO_3)_2.xH_2O$), Palladium(II) trifluoroacetate (($CF_3COO)_2Pd$), Palladium(II) hexafluoroacetylacetonate ($Pd(C_5HF_6O_2)_2$), Palladium(II) sulfate ($PdSO_4$), Palladium (II) cyanide ($Pd(CN)_2$), Palladium(II) propionate (($C_2H_5CO_2)_2Pd$), Palladium(II) potassium thiosulfate monohydrate ($K_2Pd(S_2O_3)_2.H_2O$), Dichloro(1,5-cyclooctadiene)palladium(II) ($C_8H_{12}Cl_2Pd$), Dichlorobis(triethylphosphine)palladium(II) ($[(C_2H_5)_3P]_2PdCl_2$), Ammonium tetrachloropalladate(II) (($NH_4)_2PdCl_4$), Potassium tetrachloropalladate(II) ($K_2PdCl_4$). Relevant precursor compounds containing gadolinium are gadolinium chloride Gd(III)$Cl_3$, gadolinium bromide Gd(III)$Br_3$, gadolinium iodide Gd(III)$I_3$, gadolinium flouride Gd(III)$F_3$, gadolinium (III) chloride hydrate Gd(III)$Cl_3.xH_2O$, gadolinium(III) nitrate hydrate Gd($NO_3)_3.xH_2O$, gadolinium(III) trifluoromethanesulfonate ($CF_3SO_3)_3Gd$, gadolinium(III) sulfate hydrate $Gd_2(SO_4)_3.xH_2O$, gadolinium(III) sulfate $Gd_2(SO_4)_3$, gadolinium(III) oxalate hydrate $Gd_2(C_2O_4)_3.xH_2O$, gadolinium(III) tris(isopropoxide) $C_9H_{21}GdO_3$, gadolinium(III) carbonate hydrate $Gd_2(CO_3)_3.xH_2O$, gadolinium(III) hydroxide hydrate $Gd_2(OH)_3.xH_2O$. Relevant precursor compounds containing yttrium are yttrium chloride $Y(III)Cl_3$, yttrium bromide $Y(III)Br_3$, yttrium iodide $Y(III)I_3$, yttrium flouride $Gd(III)F_3$, Y(III) chloride hydrate $Y(III)Cl_3.xH_2O$, yttrium triflouroacetate $Y(OOCCF_3)_3$, yttrium(III) nitrate hydrate $Y(NO_3)_3.xH_2O$, Yttrium acetylacetonate $Y(C_5H_7O_2)_3$ (also known as $Y(acac)_3$), Yttrium acetylacetonate hydrate $Y(C_5H_7O_2)_3.xH_2O$, yttrium(III) trifluoromethanesulfonate $(CF_3SO_3)_3Y$, Yttrium(III) acetate hydrate $(CH_3CO_2)_3Y.xH_2O$, Yttrium isopropoxide oxide $OY_5(OCH(CH_3)_2)_{13}$, yttrium(III) carbonate hydrate $Y_2(CO_3)_3.xH_2O$ Table 3 lists relevant iron containing precursor compounds. The iron atoms of the precursors are at oxidation levels 2 or 3. Further iron containing precursor compounds are iron (0) pentacarbonyl $(Fe(CO)_5)$, (+)-Iron(II) Lascorbate $(C_{12}H_{14}FeO_{12})$, Ammonium iron(II) sulfate hexahydrate $((NH_4)_2Fe(SO_4)_2.6H_2O)$, Ammonium iron(III) citrate $(C_6H_8O_7.xFe^{3+}.yNH_3)$, Ammonium iron(III) hexacyanoferrate(II) hydrate $(C_6H_6Fe_2N_7O)$, Ammonium iron(III) oxalate trihydrate $((NH_4)_3[Fe(C_2O_4)_3].3H_2O)$, Ammonium iron(III) sulfate dodecahydrate $(NH_4Fe(SO_4)_2.12H_2O)$, Cyclopentadienyl iron(II) dicarbony) dimer $(C_{14}H_{10}Fe_2O_4)$. It must be understood that the iron atom can readily be replaced with other metal atoms. In particular, the ligands of the iron complexes in Table 3 are relevant as ligands for precursor compounds of other metal atoms as well.

TABLE 3

Iron containing precursor compounds

| Iron(II) | Iron(III) |
|---|---|
| acetylacetonate $(Fe(C_5H_7O_2)_2)$ | acetylacetonate $(Fe(C_5H_7O_2)_3)$ |
| carbonate $(FeCO_3)$ | fluoride $(FeF_3)$ |
| chloride $(FeCl_2)$ | chloride $(FeCl_3)$ |
| chloride tetrahydrate $(FeCl_2 \cdot 4H_2O)$ | fluoride trihydrate $(FeF_3 \cdot 3H_2O)$ |
| bromide $(FeBr_2)$ | bromide $(FeBr_3)$ |
| iodide $(FeI_2)$ | chloride hexahydrate $(FeCl_3 \cdot 6H_2O)$ |
| D-gluconate dehydrate $([HOCH_2[CH(OH)]_4CO_2]_2Fe \cdot 2H_2O)$ | citrate $(C_6H_5FeO_7)$ |
| ethylenediammonium sulfate tetrahydrate $(FeSO_4 \cdot NH_3(CH_2)_2NH_3SO_4 \cdot 4H_2O)$ | citrate tribasic monohydrate $(C_6H_5FeO_7 \cdot H_2O)$ |
| hydroxide $(Fe(OH)_2)$ | hydroxide $(Fe(OH)_3)$ |
| fumarate $(C_4H_2FeO_4)$ | iodate $(Fe(IO_3)_3)$ |
| gluconate hydrate $((C_6H_{11}O_7)_2Fe \cdot xH_2O)$ | nitrate $(Fe(NO_3)_3 \cdot 9H_2O)$ |
| fluorosilicate $(FeSiF_6 \cdot 6H_2O)$ | nitrate nonahydrate $(Fe(NO_3)_3 \cdot 9H_2O)$ |
| oxalate dihydrate $(FeC_2O_4 \cdot 2H_2O)$ | oxalate hexahydrate $(Fe_2(C_2O_4)_3 \cdot 6H_2O)$ |
| molybdate $(FeMoO_4)$ | oxo acetate perchlorate hydrate $(C_{12}H_{24}Fe_3O_{16} \cdot ClO_4 \cdot xH_2O)$ |
| perchlorate $(Fe(ClO_4)_2 \cdot 6H_2O)$ | perchlorate $(Fe(ClO_4)_3)$ |
| perchlorate hydrate $(Fe(ClO_4)_2 \cdot xH_2O)$ | perchlorate hydrate $(Fe(ClO_4)_3 \cdot xH_2O)$ |
| nitrate $(Fe(NO_3)_2 \cdot 6H_2O)$ | phosphate $(FePO_4)$ |
| lactate hydrate $([CH_3CH(OH)COO]_2Fe \cdot xH_2O)$ | phosphate dihydrate $(FePO_4 \cdot 2H_2O)$ |
| sulfate $(FeSO_4 \cdot 7H_2O)$ | phosphate tetrahydrate $(FePO_4 \cdot 4H_2O)$ |
| sulfate heptahydrate $(FeSO_4 \cdot 7H_2O)$ | p-toluenesulfonate hexahydrate $((CH_3C_6H_4SO_3)_3Fe \cdot 6H_2O)$ |
| sulfate hydrate $(FeSO_4 \cdot xH_2O)$ | pyrophosphate $(Fe_4(P_2O_7)_3)$ |
| sulfide (FeS) | Ethylenediaminetetraacetate sodium salt hydrate $([(O_2CCH_2)_2NCH_2CH_2N(CH_2CO_2)_2]FeNa \cdot xH_2O)$ |
| tetrafluoroborate hexahydrate $(Fe(BF_4)_2 \cdot 6H_2O)$ | sulfate $(Fe_2(SO_4)_3 \cdot 9H_2O)$ |
| trifluoromethanesulfonate $(C_2F_6FeO_6S_2)$ | sulfate hydrate $(Fe_2(SO_4)_3 \cdot xH_2O)$ |
| | tartrate $(Fe_2(C_4H_4O_6)_3)$ |
| | trifluoroacetylacetonate $(C_{15}H_{12}F_9FeO_6)$ |
| | arsenate $(FeAsO_4)$ |

The platinum, ruthenium, palladium, gadolinium and yttrium precursor compounds are typically employed to provide the respective metallic nanoparticles, although it is contemplated that these may also provide metal compounds comprising a partner atom or ligand.

Figure 1B:
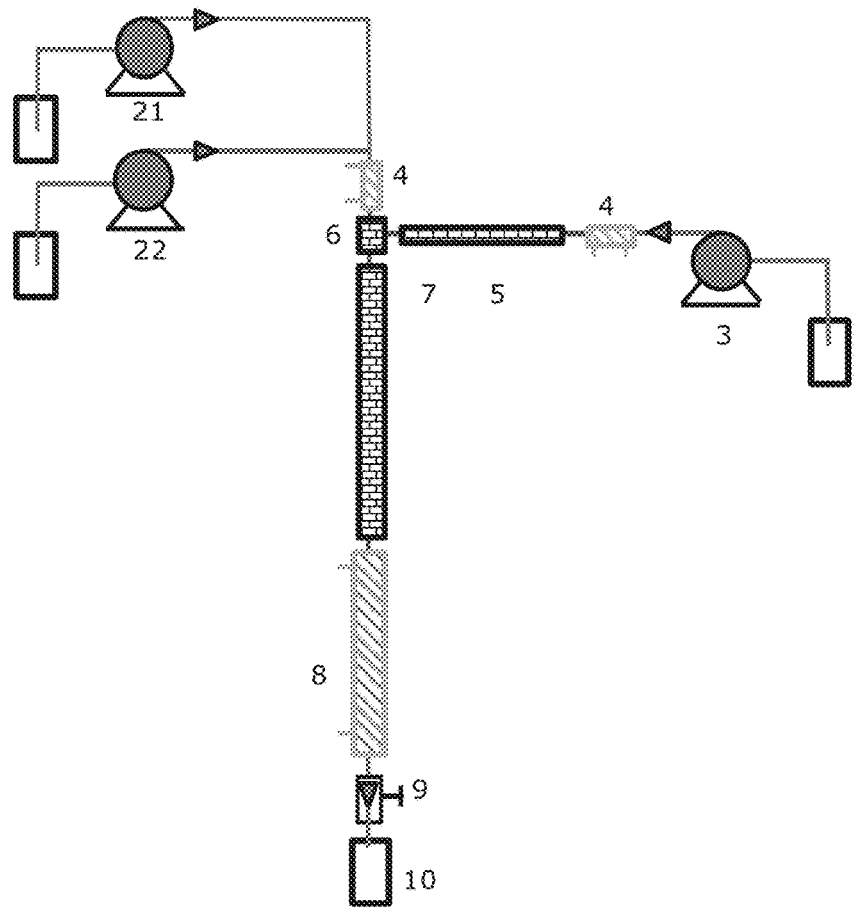
FIG. 1b shows a schematic drawing of a continuous supercritical reactor set-up with two separate reactant inlets.
Figure 2A:
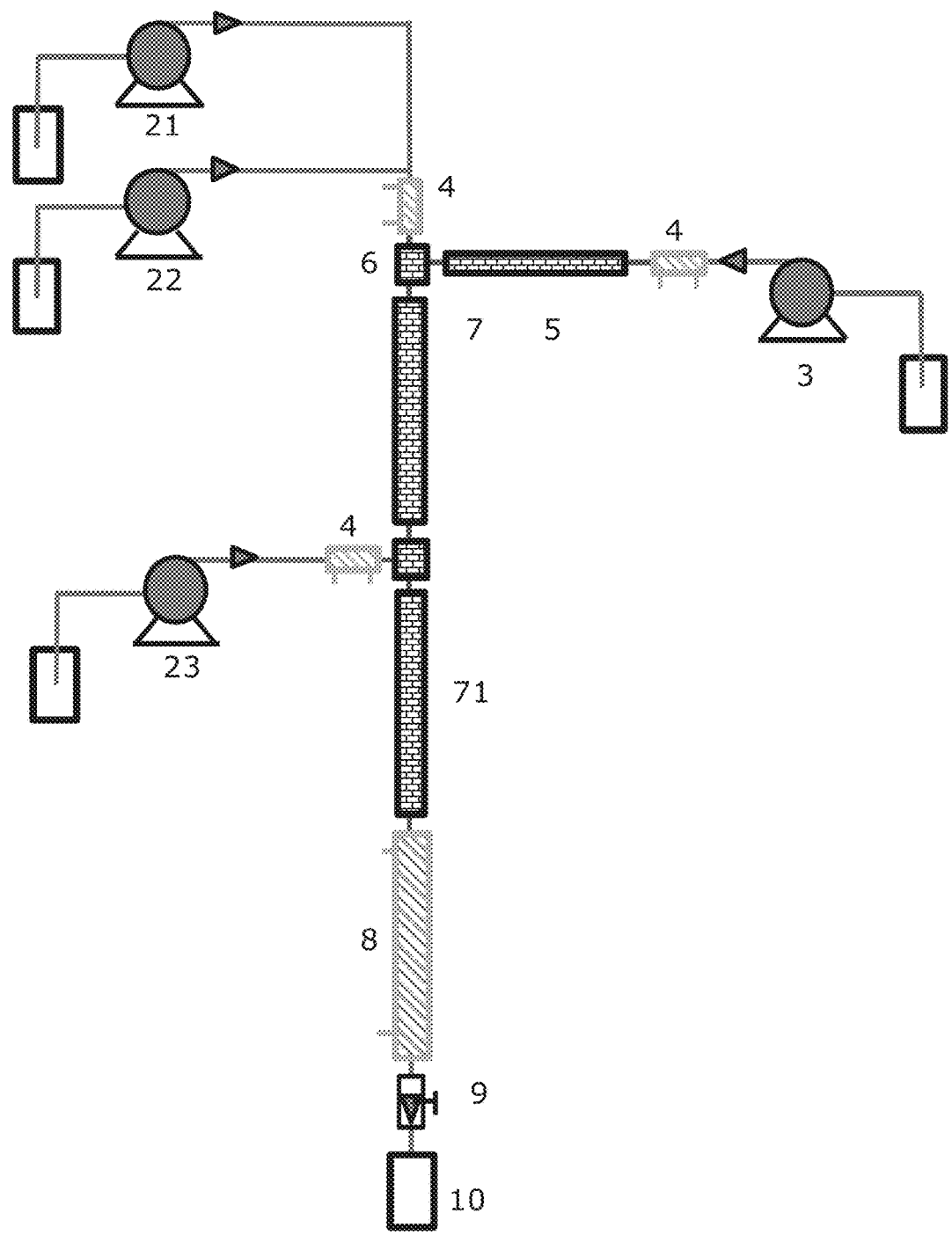
FIG. 2a shows a schematic drawing of a continuous supercritical reactor set-up with two upstream reactant inlets and a downstream reactant inlet.
Figure 2B:
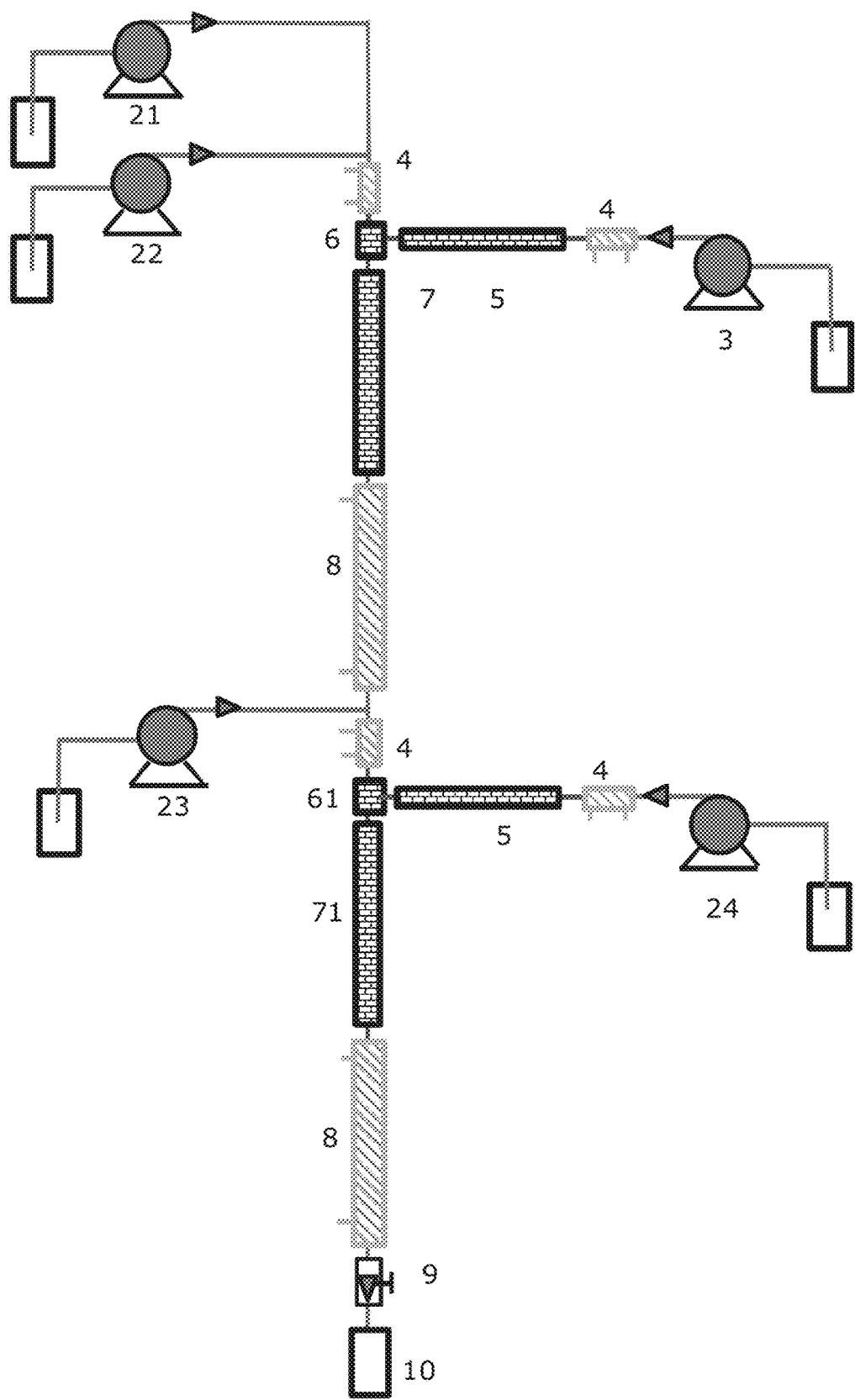
FIG. 2b shows a schematic drawing of a continuous supercritical reactor set-up with two upstream reactant inlets and a downstream reactant inlet and a downstream solvent inlet.

Exemplary set-ups of reactors for use in the present invention are illustrated in FIG. 1 and FIG. 2. Thus, FIG. 1a shows a set-up where the mixture of the solution of the precursor compound and the suspension of the support material is provided to an injector 1 via a feed pump 2. The reactive solvent is provided via a solvent pump 3 to a heater 5. Both the mixture with the support material and the precursor compound may be cooled in a cooler 4 before being supplied to a mixer 6. The cooler 4 may serve to prevent that the pump or other heat sensitive parts are heated. In the mixer 6 the step of admixing the mixture of the solution of the precursor compound and the suspension of the support material with the supercritical or subcritical reactive solvent takes place. The admixture is provided to the first section of the reactor tube 7 which first section comprises a heater. The reactor tube may comprise a cooling section 8 for liquefying the reaction solution. The set-up has a pressure release valve 9 allowing collection of the catalytic structure in a collection vessel 10. The set-up in FIG. 1b adds a further reactant pump so that the system has a first reactant pump 21 and a second reactant pump 22. This set-up does not have an injector and the reactants, i.e. the solution of the precursor compound and the suspension of the support material are mixed before they are admixed with the reactive solvent in the mixer 6. It is also contemplated to mix the solution of the precursor compound, the suspension of the support material and the reactive solvent simultaneously in an appropriate mixer (not shown). In a further reactor set-up as shown in FIG. 2a the reactor tube comprises a further inlet, so that a further precursor compound, support material, an oxidising or reducing component, or a component to activate the support material may be supplied via reactant pump 23. In this set-up a support may be supplied via a reactant pump 21 and a component to activate the support material via reactant pump 23; the precursor compound may be supplied to the, now activated, support material via reactant pump 23. Alternatively reactant pump 23 may supply a further precursor compound to provide a catalytic structure with layered or mixed catalytic nanoparticles of two different catalyst material, or it may provide a catalytic structure with two different types of catalytic nanoparticles. This set-up is specifically intended for a reactor capable of synthesising core-shell structures. In yet a further design (FIG. 2b) an additional solvent pump is added to the set-up illustrated in FIG. 2a. The additional solvent pump 24 introduces a solvent at a location downstream of the inlet to the reactor tubes of reactant pump 23, e.g. into a mixer 61 capable of mixing the stream from the reactor tube with the stream from reactant pump 23 and the additional solvent pump 24. This set-up is also specifically intended for a reactor capable of synthesising core-shell structures. For example, after the first synthesis of particles on a support (in reactor tube 7), the suspension is cooled down in cooler 8, mixed with a new reactant from reactant pump 23, and hit by a new hot string of solvent from the additional solvent pump 24 and subsequently matured further in reactor tube 71.

The invention will now be explained in the following non-limiting examples. As will be evident to the skilled person variations are possible without deviating from the invention.

EXAMPLES

Example 1

A catalytic structure of the invention was prepared as follows.

A mass of 724 mg of a platinum precursor ($H_2PtCl_6.6H_2O$) was precisely weighed on a micro scale in order to get precise concentration and weight ratio (Pt/C) in the final synthesis solution. This resulted in a pure platinum weight of 273 mg. The mass of the carbon support was determined by using the desired weight-ratio of Pt/C that for 10 wt % carbon support would be 27.3 mg, which was weighed subsequently. The two reactants respectively were mixed in separate beakers with 100 mL of ethanol as a reducing solvent, which dissolves the platinum precursor salt, but leaves the carbon support agglomerated. The carbon support was prior to the experiment sonicated for 5-10 min using an ultrasonic horn to disperse the C-support and ensure access to larger surface areas.

The two reactants were mixed in an injector with a volume of 200 mL, which was mounted in connection with the feeding pump of the super critical flow apparatus (FIG. 1a). An injector was used because the feeding pumps of the apparatus were sensitive to handling the small carbon support particles, which cause fast degradation of the packing seals. The feeding pump feeds pure solvent to the injector, hence supplying a cold reactant line of the dissolved platinum salt and carbon support. The cold reaction line was mixed abruptly with preheated solvent at a pressure of ~200 bar (adjustable) resulting in a mixing temperature of ~300° C. (adjustable) in the super critical regime of the reducing ethanol solvent. High heating rates can be obtained by mixing the cold reaction line and super critical solvent, which are important for obtaining fast nucleation and reaction uniformity. The critical temperature and pressure are solvent dependent, and hence tuneable by using different solvents. The obtained product is tuneable by using temperature and pressure, thus control of morphology, crystallinity, size and uniformity of the particles was obtained. This resulted in homogenous nanoparticles with a narrow size distribution, which is advantageous for the catalytic properties of the nanoparticles. The synthesis itself can also be performed below the super critical point of the solvent, i.e. in a subcritical state of the solvent, which again will affect the size and crystallinity of the product particles. The C-support that is present in the super- or sub-critical media prevents the nanoparticles from agglomerating, as these attach directly onto the carbon support.

The apparatus has a vertical reactor tube through which the product travels down while maturing the particles further to enhance crystallinity, and thereby generating more well-defined particles. The reaction solution was subsequently cooled indirectly by flowing water on the outside of the reaction tubing to a temperature where the solution liquefies. The pressure of the system was relieved by a valve (Pressure release valve), and the solvent, including the nanoparticles synthesised directly onto the carbon support, i.e. the catalytic structure, were continuously tapped.

The catalytic structure of the nanoparticles supported by carbon was centrifuged, and the product settled at the bottom of beakers. Subsequently the product was washed by a solvent, in this case ethanol, two times after which the final product could be dried on a glass beaker.

A modified version of the apparatus employed will assure that the reaction will not start prematurely in the injector, as the two reactants can be mixed just prior to meeting the superheated, e.g. supercritical, solvent. Furthermore, the injector can be omitted due to the use of robust industrial feeding pumps. Another improved apparatus design comprises the addition of several reaction inlets at different positions, which allow for greater flexibility.

Example 2

The syntheses of the catalytic platinum and platinum-ruthenium nanoparticles directly onto various carbon supports are here reported. The syntheses were performed in the supercritical regime, which for the solvent ethanol is above 241° C. and 61.4 Bar.

The reactions were carried out in a purpose built synthesis flow system which can withstand the harsh conditions of the supercritical fluids. The schematic shown in FIG. 1a is a simplified version of the experimental set-up in which the general parts are illustrated.

The precursor compound, e.g. platinum precursor ($H_2PtCl_6 \cdot 6H_2O$; 721 mg), was prior to the experiment dissolved in 50 mL of ethanol leading to a solution of the metal precursor. The support material, e.g. graphene support (67.1 mg), was dispersed in 50 mL of ethanol, and sonicated for a few minutes to minimise agglomeration and obtain an optimal dispersion.

The metal precursor solution and the dispersed carbon support were mixed in an injector. The system was pressurised to a synthesis pressure of 180-190 Bar. At the mixing point the cold reactant stream was mixed with the super critical preheated solvent, ethanol, leading to a mixing temperature of 258-267° C. The rapid increase in the temperature leads to fast homogenous nucleation resulting in monodisperse nanoparticles. The continuous flow of the produced nanoparticles on the carbon support was withdrawn from the system using a pressure release valve.

Figure 3:
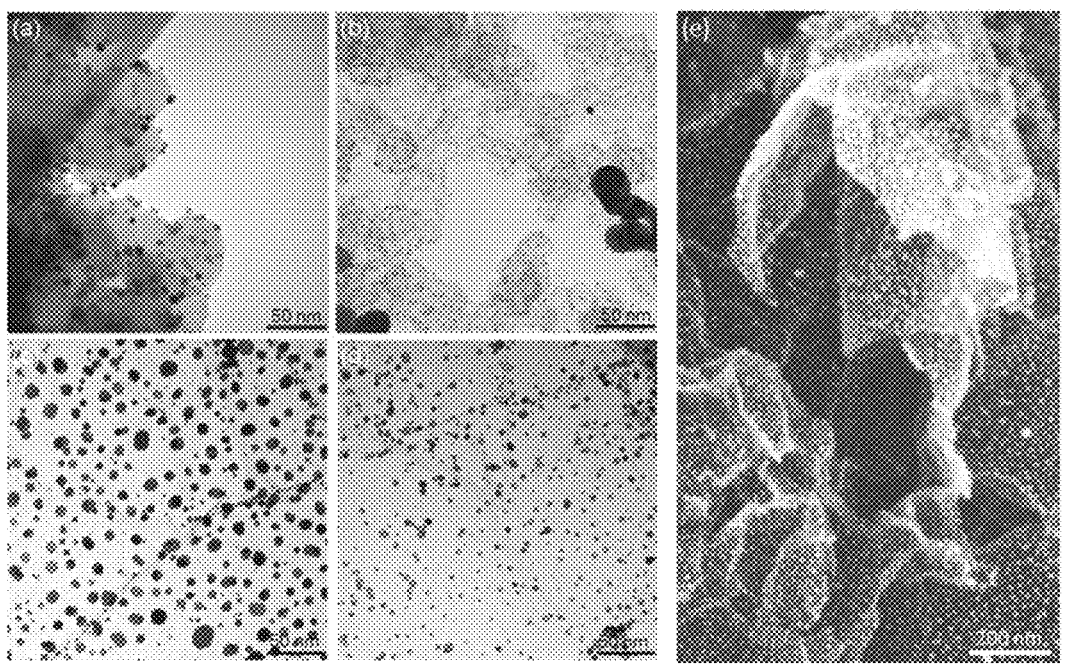
FIG. 3a-e show electron micrograph images of an embodiment of the invention.
Figure 4:
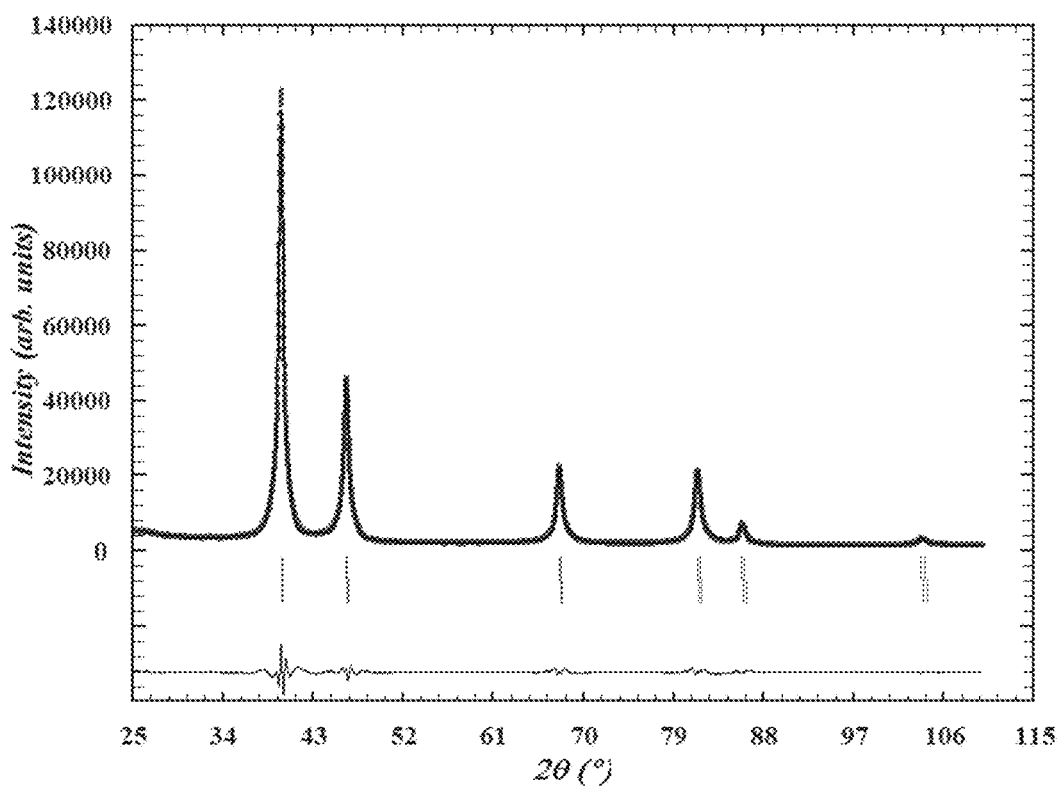
FIG. 4 shows a powder X-ray diffraction (PXRD) of the catalytic structure of the invention.
Figure 5:
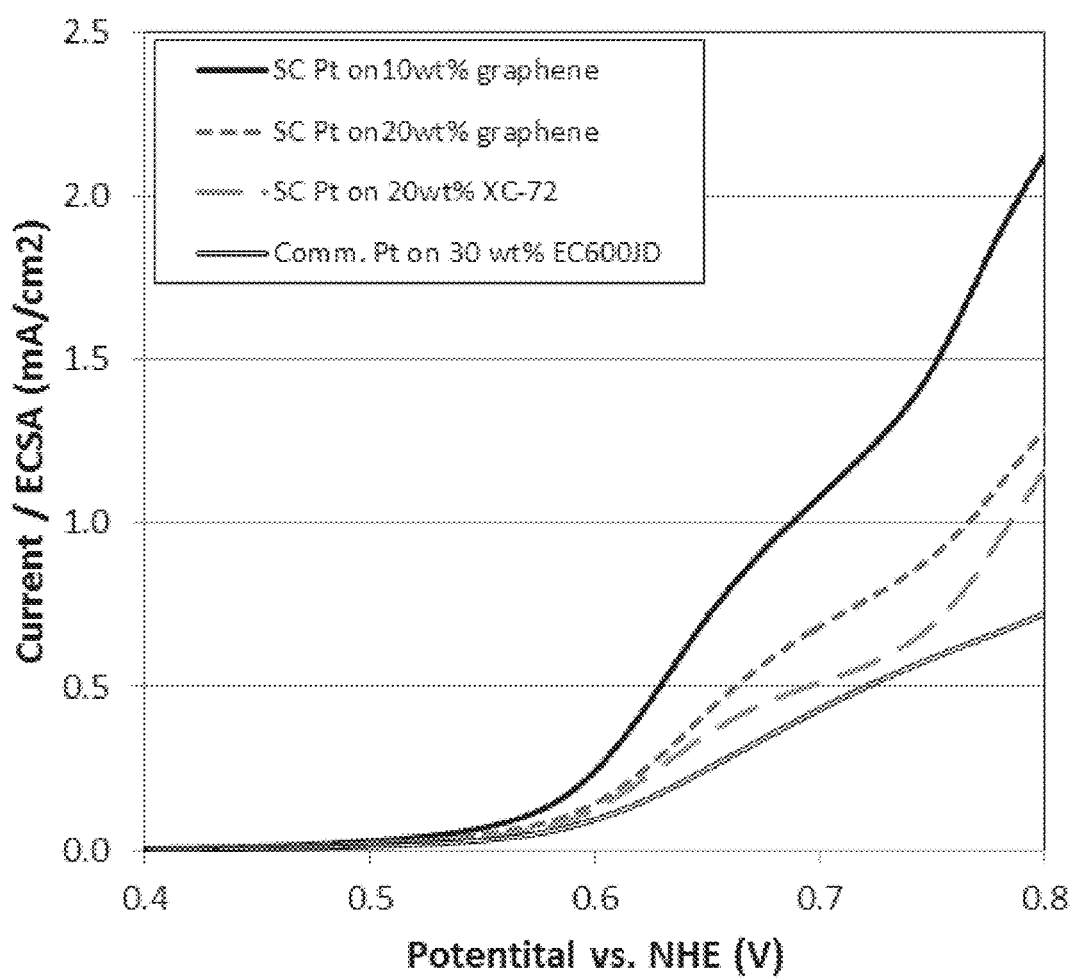
FIG. 5 shows a cyclic voltammetry (CV) plot of for catalytic structures of the invention compared to a commercial catalytic structure.

The synthesis products were characterized using powder X-ray diffraction (PXRD), scanning electron microscopy (SEM) and transmission electron microscopy (TEM). The catalytic activity of the powders was characterized using cyclic voltammetry (CV) in a three-electrode electrochemical set-up. FIG. 3 shows electron micrographs of exemplary catalytic supports, FIG. 4 shows an PXRD diffractogram of a catalytic structure, and FIG. 5 shows CV-plots of the catalytic structures of the invention compared to a commercial catalytic structure.

The PXRD of the crystalline catalyst materials results in diffractograms. One example is shown in FIG. 4 illustrating the result for nanoparticles prepared from $H_2PtCl_6 \cdot 6H_2O$ with 20 wt % graphene; a fit is shown along with the PXRD data for the size determination. From the Bragg-angles, the material and crystal structure can be found while the line broadening provides information about the particle (grain) sizes. FIG. 3 shows TEM and SEM images of samples of the prepared catalytic structures. Thus, FIG. 3a shows a TEM image of Pt-particles on Carbon Black XC-72; FIG. 3b shows a TEM image of Pt-particles on Ketjenblack EC600JD; FIG. 3c shows a TEM image of Pt-particles on graphene (10 wt % graphene); the sizes of the nanoparticles are seen to range from 5 nm to 20 nm. FIG. 3d shows a TEM image of Pt-particles on graphene, with a lower Pt-loading (20 wt % graphene) than FIG. 3c; the sizes of the nanoparticles range from 2 nm to 8 nm. FIG. 3e shows a SEM image of Pt-particles on graphene (10 wt % graphene); both small and larger nanoparticles are seen. SEM of the powders provide an overview of the particle composition on the support, as well as the material distribution using energy dispersive x-rays (EDX). TEM provides higher magnified images of the particles, and thus the particle size distribution can be found (FIG. 3).

The catalytic activity is found from CV measurements (see FIG. 5), where a mixture of powder and Nafion (proton conducting ionomer) is dispersed on a glassy-carbon electrode. This electrode is used as a working electrode in a three-electrode system, whereas a pure Pt electrode is used as a counter electrode and a Mercury-Mercurous Sulphate electrode is used as a reference. The electrochemical surface area is found by CO-stripping in a 0.5 M $H_2SO_4$ solution, while a 1 M MeOH+0.5 M $H_2SO_4$ solution is used for the electrochemical activity of the powders.

Table 4 presents the most important synthesis of Pt or PtRu nanoparticles onto support materials. Mainly three carbon supports have been used; Graphene nanopowder (1-3 layers of graphene, diameter approx. 10 μm) and two types of carbon black pallets (Carbon Black XC-72 and Ketjenblack EC600JD), but also MWCNTs and reduced graphene oxide have been used. The stated weight percentage of the support is given with respect to the amount of pure Pt, or Pt and Ru in the precursor. TEM images and CV measurements have only been taken/made for a few of these experiments, while all have been analysed with PXRD. The premixing of support and precursor in the injector causes a redox reaction and a small part of the precursor reacts and solidifies on the support before injection in the reactor, resulting in large particles larger than 20 nm. After injection, the remaining (major part) of the precursor reacts and solidifies on the support as small nanoparticles in the order of 5 nm, in the controlled environment. This division in sizes of the catalyst nanoparticles is seen from the PXRD data, and results in two size-readouts. FIG. 3e shows a SEM image where both small and large particles are present. Separate inlets of precursor and support prevent this preinjection reaction on the support.

TABLE 4

Most important syntheses of Pt-nanoparticles onto supports in a reactor set-up with one inlet to the reactor tube.

| Precursor | Support | Solvent | T (° C.)/P (bar) | Particle size (nm) |
|---|---|---|---|---|
| $H_2PtCl_6 \cdot 6H_2O$ | 10 wt % graphene | Ethanol | 248-252° C./ 185-190 bar | 20 nm/ 7 nm |
| $H_2PtCl_6 \cdot 6H_2O$ | 20 wt % graphene | Ethanol | 258-267° C./ 180-190 bar | 21 nm/ 6 nm |
| $H_2PtCl_6 \cdot 6H_2O$ | 30 wt % graphene | Ethanol | 278-287° C./ 170-190 bar | 23 nm/ 6 nm |
| $H_2PtCl_6 \cdot 6H_2O$ | 20 wt % rGO | Ethanol | 271-285° C./ 190-220 bar | 22 nm/ 6 nm |
| $H_2PtCl_6 \cdot 6H_2O$ | 20 wt % XC-72 | Ethanol | 250-280 | 35 nm/ 4 nm |
| $H_2PtCl_6 \cdot 6H_2O$ | 20 wt % EC600JD | Ethanol | 275-276° C./ 190-230 bar | 22 nm/ 4 nm |
| $H_2PtCl_6 \cdot 6H_2O$ | 30 wt % EC600JD | Ethanol | 280-283° C./ 190 bar | 21 nm/ 3 nm |
| $H_2PtCl_6 \cdot 6H_2O$ | 40 wt % EC600JD | Ethanol | 283-295° C./ 170-205 bar | 20 nm/ 3 nm |
| $Pt(acac)_2$ | 5 wt % graphene | Ethanol + acetylacetone | ~300° C./ 200-300 bar | |
| $Pt(acac)_2$ | 10 wt % graphene | Ethanol + acetylacetone | ~300° C./ 200-300 bar | |
| $Pt(acac)_2$ | 10 wt % XC-72 | Ethanol + acetylacetone | ~300° C./ 200-300 bar | |
| $Pt(acac)_2$ | 20 wt % XC-72 | Ethanol + acetylacetone | ~300° C./ 200-300 bar | |
| $Pt(acac)_2$ | 10 wt % MWCNTs | Ethanol + acetylacetone | ~300° C./ 200-300 bar | |
| $Pt(acac)_2$ | 20 wt % MWCNTs | Ethanol + acetylacetone | ~300° C./ 200-300 bar | |
| $Pt(acac)_2$ + $Ru(acac)_3$ | 10 wt % XC-72 | Ethanol + acetylacetone | ~300° C./ 200-300 bar | |
| $Pt(acac)_2$ + $Ru(acac)_3$ | 20 wt % XC-72 | Ethanol + acetylacetone | ~300° C./ 200-300 bar | |

The grain size investigations show that using $Pt(acac)_2$ as precursor resulted in almost only large Pt particles (>15 nm), as opposed to using $H_2PtCl_6 \cdot 6H_2O$ as precursor where the size distribution was largely dominated by 4-6 nm Pt particles. Thus, the precursor compound may be selected to control the size of the catalyst nanoparticles.

In certain experiments the reactive ethanol solvents were supplemented with small concentrations of $H_2O$, $H_2O_2$ or $H_2SO_4$ (<5%). The components of the reactive solvent can enhance the nanocarbon activation.

The catalytic activity of the prepared catalytic structures was found from CV measurements analysing approximately 4 mg powder of each sample. A 1 M MeOH+0.5 M $H_2SO_4$ solution was used to measure the electrochemical activity of the powders, and the resulting CV curves for some of the powders are shown in FIG. 5, compared to commercial catalyst particles from Johnsson Matthey (HiSpec 13100), which were tested under identical conditions. FIG. 5 thus shows the results for three different catalytic structures produced within the supercritical flow reactor (details of the synthesis are given in FIG. 5). The graph shows the current divided by the electrochemical surface area vs. the applied the potential. The graph of FIG. 5 clearly shows the potential of the produced catalytic structure, showing higher currents at any relevant potential than the commercial reference. The catalyst synthesised onto graphene shows the most promising characteristics.

Example 3

The synthesis of the catalytic platinum nanoparticles directly onto carbon supports is here reported. The syntheses were performed in the supercritical regime, which for the solvent ethanol is above 241° C. and 61.4 Bar.

The reactions were carried out in a purpose built synthesis flow system which can withstand the harsh conditions of the supercritical fluids. The schematic shown in FIG. 1b is a simplified version of the experimental set-up in which the general parts are illustrated.

The platinum precursor ($H_2PtCl_6.6H_2O$; 724 mg) was prior to the experiment dissolved in 50 mL of ethanol leading to a solution of the metal precursor compound. The graphene support was dispersed in 50 mL of ethanol, and sonicated for a few minutes to minimise agglomeration and obtain an optimal dispersion.

The metal precursor compound solution was pumped through reaction pump 1, whereas the dispersed carbon support was pumped through reaction pump 2 into the pressurized system at 180-220 Bar. At the mixing point the cold reactant streams mix with the super critical preheated reactive solvent, ethanol, leading to a mixing temperature above the supercritical temperature of ethanol. The exact temperature was not recorded. The rapid increase in the temperature leads to fast homogenous nucleation resulting in monodisperse nanoparticles. The continuous flow of the produced nanoparticles on the carbon support was withdrawn from the system using a pressure release valve, which also kept the system pressurized.

The synthesised products, the catalytic structures, were characterized using PXRD, SEM and TEM as described previously.

The separate inlets prevented a premature redox reaction and thus that the precursors solidify on the carbon substrates before entering the reactor and the supercritical regime. Thus no large nanoparticles were found from the PXRD measurements, backing up our thesis from the results of Example 2. The grain sizes are shown in Table 5.

TABLE 5

Pressure conditions and particle size of preferred embodiments for synthesizing Pt nanoparticles on supports.

| Precursor | Support | P (bar) | Particle size (nm) |
|---|---|---|---|
| $H_2PtCl_6 \cdot 6H_2O$ | 10 wt % graphene | 180-220 | Impurity phase |
| $H_2PtCl_6 \cdot 6H_2O$ | 20 wt % graphene | 130-230 | 4 |
| $H_2PtCl_6 \cdot 6H_2O$ | 20 wt % XC-72 | 180-220 | 5 |
| $H_2PtCl_6 \cdot 6H_2O$ | 30 wt % XC-72 | 180-220 | 5 |
| $H_2PtCl_6 \cdot 6H_2O$ | 20 wt % EC600JD | 180-220 | 4 |
| $H_2PtCl_6 \cdot 6H_2O$ | 30 wt % EC600JD | 180-220 | 4 |

Example 4

The synthesis of the catalytic platinum nanoparticles directly onto KetjenBlack EC600jd ("KB") as a carbon support material is here reported. The syntheses were performed in the supercritical regime, which for the solvent ethanol is above 241° C. and 61.4 Bar.

The reactions were carried out in a purpose built synthesis flow system which can withstand the harsh conditions of the supercritical fluids. A schematic drawing is shown in FIG. 1b.

General Description of the Experiments

The platinum precursor ($H_2PtCl_6.6H_2O$; 717 mg, 0.00138M) was prior to the experiment dissolved in 100 mL of ethanol leading to a solution of the metal precursor. The carbon support (270 mg for a 50:50 Pt:C ratio) was dispersed in 100 mL Ethanol and with 1 vol % Ethylene Glycol (EG), and sonicated for 10 minutes to achieve good particle dispersion. The EG improves the carbon dispersion in the solvent, and 1 vol % has proved to be enough, minimising the chance of a pump-stops.

The metal precursor solution was pumped through reaction pump 21, whereas the dispersed carbon support was pumped through reaction pump 22 into the pressurized system at a constant pressure of 100-300 Bar (+/−10 bar). Both pumps 21,22 were kept at a flow of 10 mL/min, though other experiments have been performed in the range of 5-15 mL/min. The solvent heater was kept at 450° C. while the vertical heater was kept constant at 250° C.-425° C. The precursor and support streams meet and proper mixing of the two is ensured through static mixers installed within the pipes. At the mixing point 6 the cold reactants streams mix with the supercritical preheated solvent, ethanol, leading to a mixing temperature near or above the supercritical temperature of ethanol, easily adjusted by the solvent pump 3 flow rate. The exact mixing temperature was recorded and kept at 257° C. (+/−5° C.), which is well above the supercritical temperature. The rapid increase in the temperature leads to fast homogenous nucleation resulting in monodisperse nanoparticles, which are further matured down the vertical heater before being cooled down. The continuous flow of the produced nanoparticles on the carbon support was withdrawn from the system using a pressure release valve 9, which also keeps the system pressurized. The first and last 25% of the synthesised product is discarded to minimise concentration variations that may occur at start and end of the experiment to dilution of the reactant strings. It is noted that when the process is set up to operate on a continuous basis the amount of catalyst prepared as the first and last part that may be discarded will be insignificant compared to the remaining product.

Figure 6:
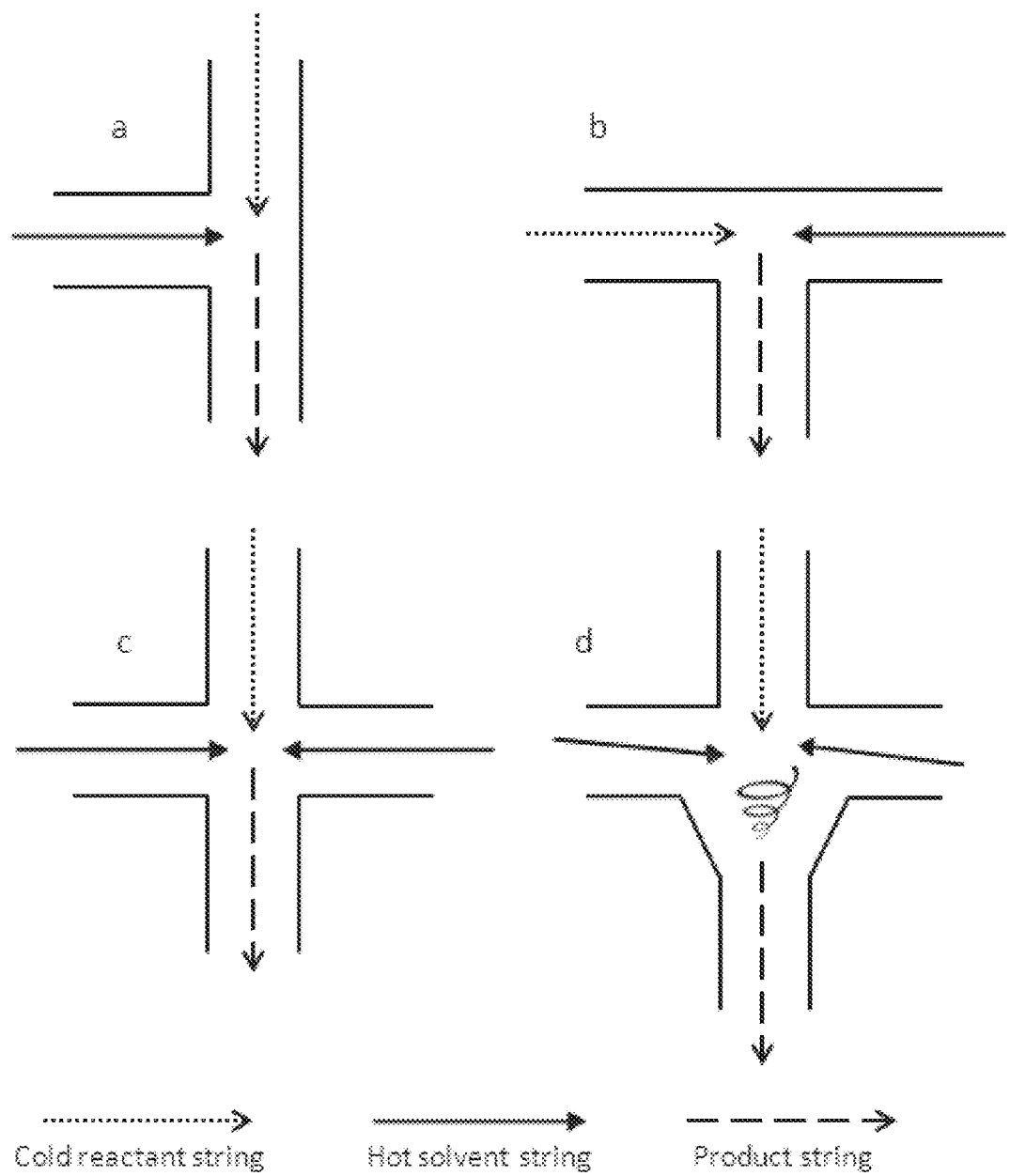
FIG. 6 shows various mixing geometries for proper mixing of the reactants with the hot solvent string; (a) and (b) cross-mixing, (c) opposing flow-mixing, and (d) vortex-mixing.

The separate inlets prevent the reaction to occur prematurely and thus the precursor from solidifying on the carbon substrates before entering the reactor and the supercritical regime. In order for proper mixing of the precursor and support, a static mixer is used before reaching the hot solvent. In order for proper mixing with the hot solvent, various mixing geometries can be used, such as cross-, vortex- or opposing flow-mixing, illustrated in FIG. 6.

While the Ethylene Glycol in the support mixture improves the carbon support dispersion, further dispersion improvement can be achieved by activating the carbon support. In our case, both boiling in 8M $HNO_3$ for 8 hours as well as stirring in 2M $H_2O_2$ for 48 hours were tried, both improving the carbon dispersion due to an activation of the carbon surfaces. This surface functionalisation, however, also affects the interaction with the negatively charged Pt-salt in the supercritical solvent, and thus neither the $HNO_3$- nor the $H_2O_2$-activation improved the catalytic properties of the produced catalyst. Also dispersion agents, such as Polyvinylpyrrolidone (PVP), have been tried.

The synthesis products were characterised using powder X-ray diffraction (PXRD), scanning electron microscopy (SEM), scanning transmission electron microscopy (STEM), thermogravimetric analysis (TGA) (Pt:C ratio) and half-cell cyclic voltammetry (CV) (mass activity (MA) and electrochemical surface area (ECSA).

The electrochemical surface area (ECSA) was measured from CO-adsorption in 0.1M $HClO_4$. The mass activity (MA) was found from the oxygen reduction reaction (ORR) at 0.9 V, sweeping with 50 mV/s in oxygen saturated 0.1M $HClO_4$ solution, while rotating the glassy carbon electrode at 1600 rpm.

Size Control

Figure 7A:
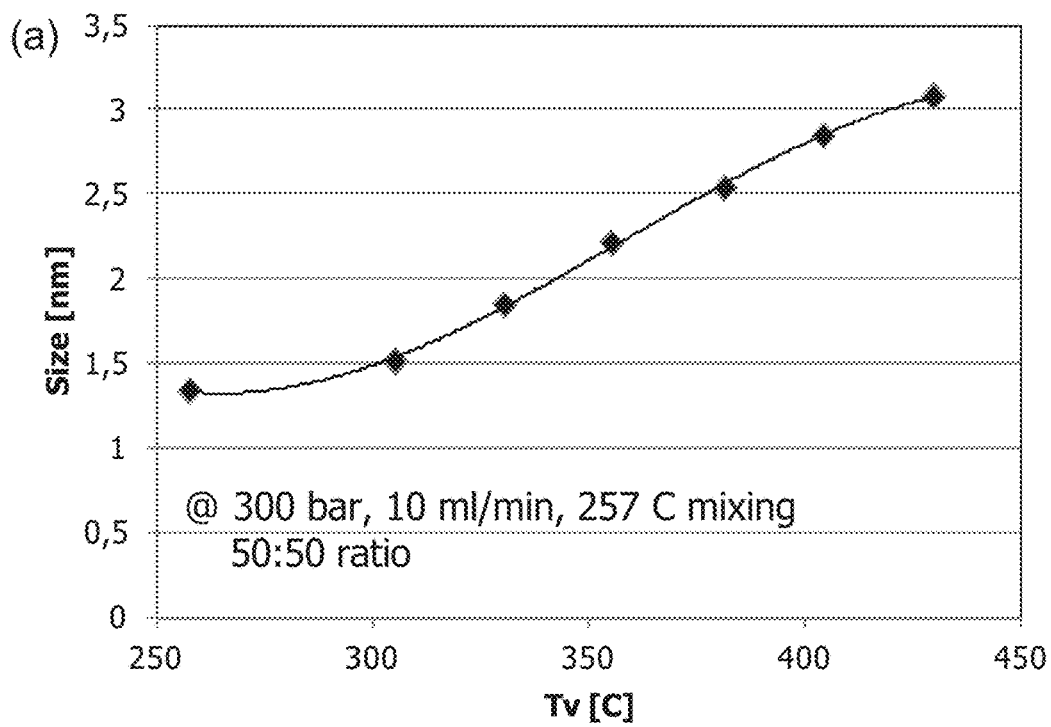
FIGS. 7a and 7b show the correlation of the vertical heater temperature ($T_v$), pressure (P) and the Pt average particle size (PXRD measured).
Figure 7B:
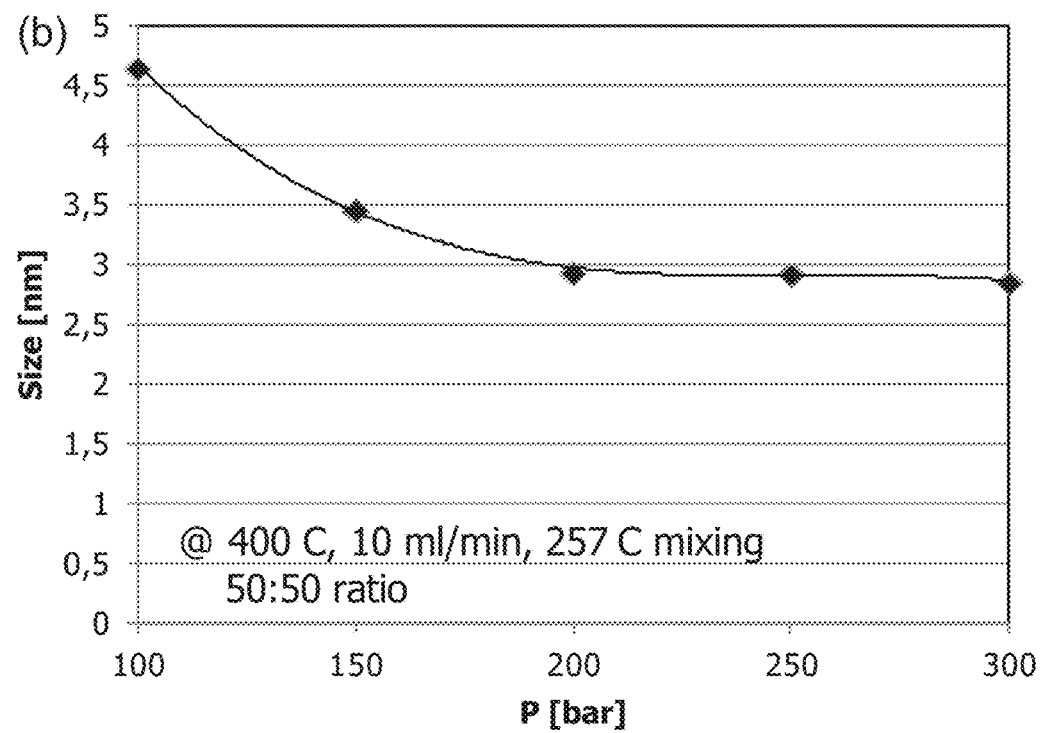
Figure 8:
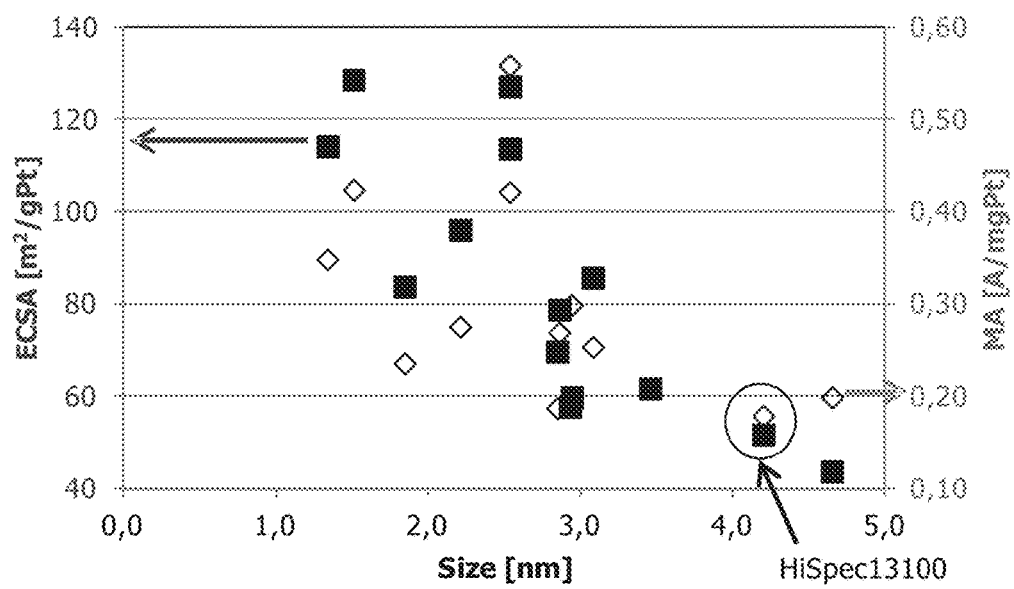
FIG. 8 shows the correlation of size, ECSA and MA, of the Pt particles synthesised on KetjenBlack (KB).

The graphs in FIG. 7 show the vertical heater (maturing) temperature ($T_v$) and pressure (p) dependence on the Pt particle size (PXRD measured), and illustrate a very precise size control in the 1-5 nm range. Specifically, in FIG. 7 The flow of both pump 21 and 22 were kept at 10 mL/min, while the solvent pump 3 was adjusted to give a mixing temperature of 257° C. The temperature dependence (a) was measured at p=300 bar, while the pressure dependence (b) was measured at $T_v$=400° C. The electrochemical measurements (ECSA and MA) of these particles are shown in FIG. 8, indicating an increase in both surface area and activity with decreasing particle size. For comparison Johnson Matthey Hispec13100 with an average size of 4.2 nm is included in the graph in FIG. 8. Long-term (stress) tests have not been performed, though it is expected that smaller Pt particles will deteriorate faster than bigger, due to agglomeration, sintering and dissolution of the Pt.

Figure 9:
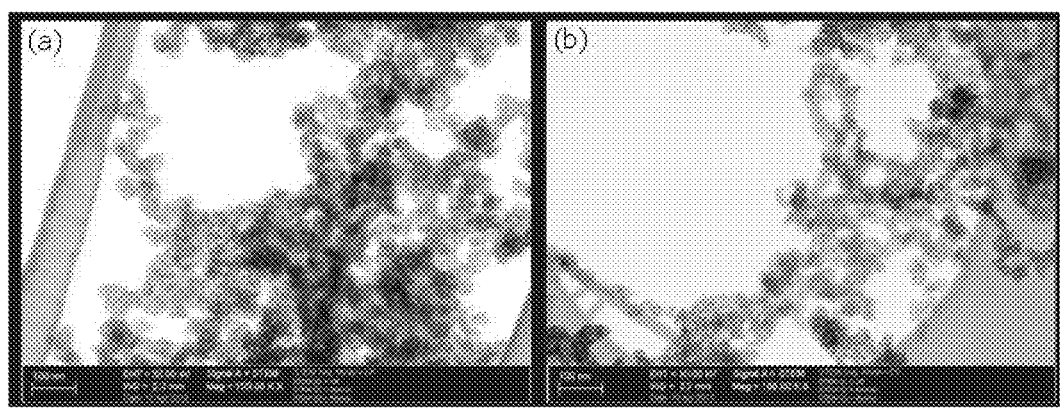
FIG. 9 shows Scanning Transmission Electron Micrographs (30 kV) showing catalyst product synthesised at (a) $T_v=250°$ C., p=300 bar, size=1.5 nm and (b) $T_v=400°$ C., p=300 bar, size=3 nm.

The distribution of the Pt particles on the KetjenBlack is shown in FIG. 9, for two sizes of particles. For both, a good Pt particle distribution is seen with no unattached, agglomerated Pt.

Pt:C-Ratios

Figure 10:
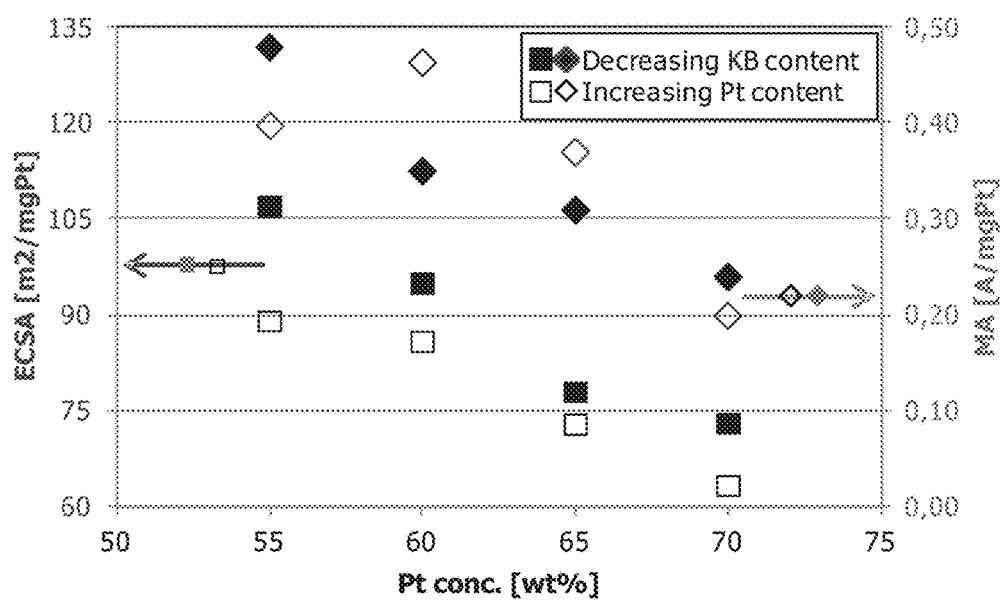
FIG. 10 shows the correlation of Pt:C ratio, ECSA and MA of Pt particles synthesised on KB.

The Pt:C ratio of the synthesised catalyst is easily regulated from the concentrations of the Pt precursor and Ketjen-Black (or the pump flow rates). The graphs in FIG. 10 show the correlation of the Pt:KB ratio, ECSA and MA of Pt particles synthesised on KB. Specifically, the catalyst structures were synthesised with a constant $H_2PtCl_6$ concentration (0.00138 M) and varying KB content (filled markers), or the catalyst structures were synthesised with a constant KB amount (270 mg in 99 ml EtOH/1 ml EG) and varying $H_2PtCl_6$ concentration (hollow markers). A small decrease in both ECSA and MA is seen with increasing Pt concentration, which can be ascribed to better dispersion of the Pt particles on the support for lower Pt concentrations.

Other Carbon Supports

Figure 11:
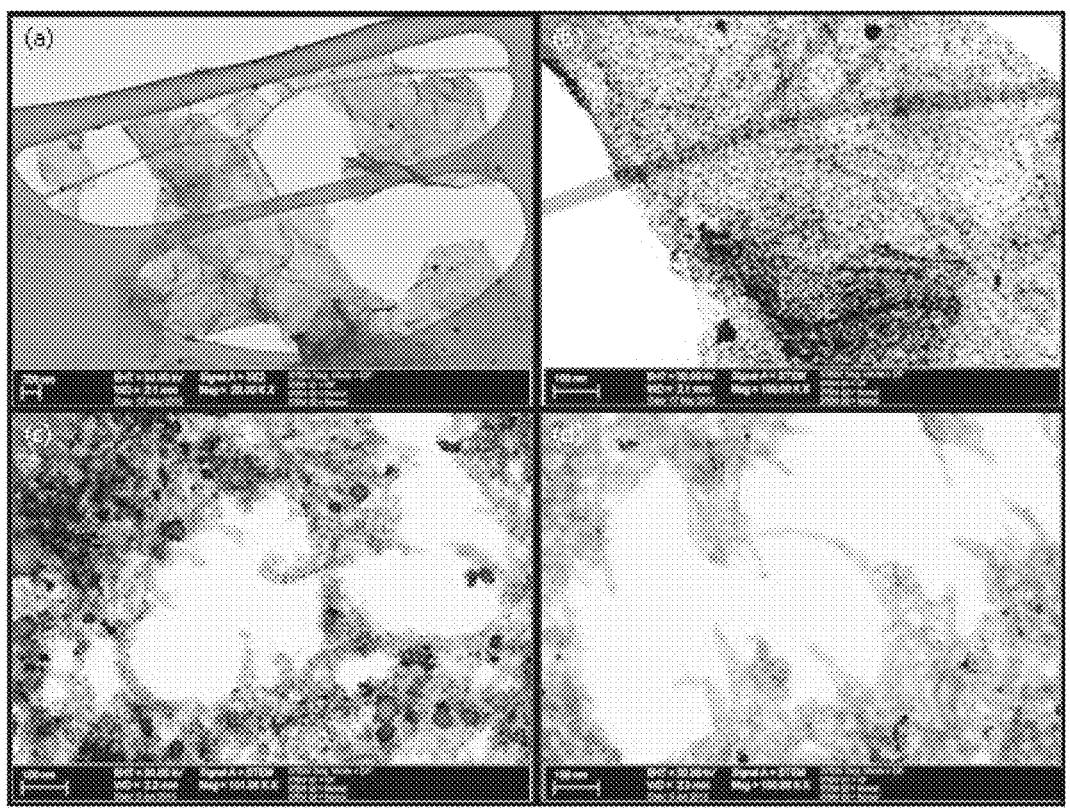
FIG. 11 shows Scanning Transmission Electron Micrographs showing Pt particles synthesised onto various carbon supports; (a) and (b) Pt particles on graphene with ratio 50:50 (Pt:G), (c) Pt particles on MWCNTs (8-13 nm diameter) with ratio 50:50 (Pt:CNT), (d) Pt particles on MWCNTs (8-13 nm diameter) with ratio 20:80 (Pt:CNT).

Other carbon nanoparticles than KetjenBlack have been tested as catalyst support materials, including different types of carbon nanotubes and graphene flakes, to increase both activity as well as durability of the catalyst. Electron micrographs of some of these synthesised catalyst materials are shown in FIG. 11. Specifically, FIG. 11 in (a) and (b) show Pt particles on graphene with ratio 50:50 (Pt:G); (c) shows Pt particles on MWCNTs (8-13 nm diameter) with ratio 50:50 (Pt:CNT), and (d) shows Pt particles on MWCNTs (8-13 nm diameter) with ratio 20:80 (Pt:CNT). Several types of graphene have been used, though the most suitable has been thermally exfoliated and acid refined flakes with many defects and voids (grade AO-1 from www.graphene-supermarketcom), with a surface area of 700 $m^2/g$ (shown in FIGS. 11(a) and (b). Both ECSA and MA were comparable to Pt on KB (ECSA=50-90 $m^2/gPt$, MA=0.2-0.3 A/mgPt), though especially the MA measurements were complicated by the fact that graphene likes to stack when dried on the electrode, causing oxygen starvation during the measurement for a lot of the Pt particles. Thus higher MAs are to be expected.

Also for the CNTs several types have been used, where mainly diameter, length and surface treatment were the varying parameters, all multi-walled (MWCNT). A good Pt distribution on HD plasma treated tubes was achieved, though the low surface area of the tubes (diameter 13-18 nm, surface area below 100 $m^2/g$) resulted in an excess amount of Pt unable to synthesise on the carbon surface, instead causing agglomerated Pt particles. Still ECSAs of 50-80 $m^2/gPt$ and MAs over 0.2 A/mgPt were achieved. Thinner MWCNTs (diameter 8-15 nm, surface area approximately 233 $m^2/g$) were also tried, with lengths of 0.5-2 μm, and ECSA and MA in the same range. As Pt agglomerations were seen (carbon surface area much lower than that of KetjenBlack EC600jd; 1400 $m^2/g$) varying Pt:C ratios were tried, as shown in FIGS. 11(c) and (d), with lower amounts of Pt, thus reducing the amount of agglomerated Pt particles.

Figure 12:
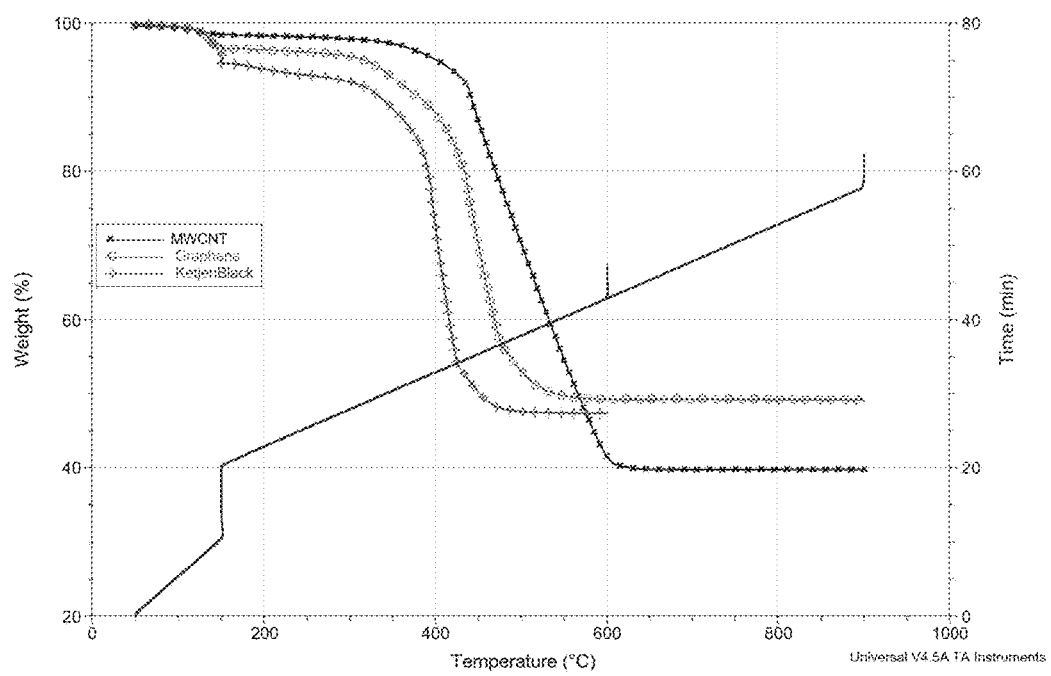
FIG. 12 shows thermogravimetric analysis (TGA) of three different catalysts with different carbon support nanomaterials.

While no durability tests of the catalyst have been performed yet, thermogravimetric analysis (TGA), from which the exact Pt:C ratio is found (the catalyst is weighted while all carbon is burned), shows the effect on durability for a graphitised support. FIG. 12 shows the TGA analysis of three different catalysts with different carbon support nanomaterials. The solid curve shows time is progressing as a function of temperature. A 5% oxygen atmosphere was let into the chamber after 20 minutes at 150° C. (after degassing in $N_2$ at 150° C. and below). The catalyst with KetjenBlack as support is seen to burn at the lowest temperature, whereas the MWCNT burned at the highest. The MWCNT catalyst had 40 wt % Pt while the Graphene and KetjenBlack catalyst had 50 wt % Pt.

Pt synthesis with new short single-walled tubes and short multi-walled with a diameter below 8 nm (both tubes with a surface area of 400-500 $m^2/g$) are planned as future experiments.

All results presented for the tubes, were for $H_2O_2$-activated tubes, as non-activated tubes tends to agglomerate and settle quickly. The $H_2O_2$ activation is fairly mild, to preserve the tube-structure.

Example 5

The synthesis of the catalytic platinum nanoparticles directly onto KetjenBlack EC600jd (KB) is here reported. The syntheses were performed in the supercritical regime with ethanol as the reactive solvent. A schematic drawing of the set-up is shown in FIG. 1b.

The platinum precursor ($H_2PtCl_6 \cdot 6H_2O$; 357 mg, 0.00138M) was prior to the experiment dissolved in 50 mL of ethanol leading to a solution of the metal precursor. The carbon support (135 mg for a 50:50 Pt:C ratio) was dispersed in 50 ml absolute EtOH or in a mixture of Ethanol and Ethylene Glycol (EG) (1-25 vol % EG), and sonicated for 10 minutes to achieve good particle dispersion. The EG improves the carbon dispersion in the solvent, while also acting as a reducing agent.

The metal precursor solution was pumped through reaction pump 21, whereas the dispersed carbon support was pumped through reaction pump 22 into the pressurised system at 290-310 Bar. The solvent heater was kept at 450° C. while the vertical heater was kept at 400° C. At the mixing point the cold reactants streams mix with the super critical preheated solvent, ethanol, leading to a mixing temperature near or above the supercritical temperature of ethanol, easily adjusted by the pump flow rates. The exact temperature was recorded. The rapid increase in the temperature leads to fast homogenous nucleation resulting in monodisperse nanoparticles. The continuous flow of the produced nanoparticles on the carbon support was withdrawn from the system using a pressure release valve, which also kept the system pressurised.

The synthesis products were characterized using PXRD, SEM, STEM, TEM and half-cell cyclic voltammetry (CV) as described previously.

Table 6 shows the results when varying the Ethylene Glycol content in the carbon support solution. A good dispersion was observed at only 1 vol % EG, minimizing the chance of a pump-stop compared to 0% EG. The PXRD and ECSA results also show the most promising results with 1 vol % EG.

Table 7 shows the results when varying the mixing temperature, controlled by the solvent flow. A preferred mixing temperature of about 260° C. is observed, and a Scanning Transmission Electron Micrograph of this product revealed good Pt distribution on the carbon support and very little Pt particle agglomeration.

Lower mixing temperatures are seen to produce particles with smaller mean size, however when close to the critical temperature ($T_c$=243° C. for EtOH) larger fluctuations in pressure and hence temperature and particle size are observed, resulting in a lower ECSA.

TABLE 6

Size and ECSA of preferred embodiments for synthesising Pt nanoparticles on ketjenblack EC600jd, with various amounts of Ethylene Glycol. All with $H_2PtCl_6 \times 6H_2O$ as precursor and Ethanol as solvent, and synthesized at $T_{sol}$ = 450° C., P = 300 bar and $T_{mix}$ = 270° C.

| | Ethylene Glycol | | | | |
| --- | --- | --- | --- | --- | --- |
| | 1% | 2% | 5% | 10% | 25% |
| Mean size (PXRD) | 5 nm | 5 nm | 5 nm | 5 nm | 6 nm |
| ECSA (Hupd) | 65 m²/g | 50 m²/g | 54 m²/g | 46 m²/g | 40 m²/g |

TABLE 7

Size and ECSA of preferred embodiments for synthesizing Pt nanoparticles on ketjenblack EC600jd, with 1 vol % Ethylene Glycol at various $T_{mix}$. All with $H_2PtCl_6 \times 6H_2O$ as precursor and Ethanol as solvent, and synthesized at $T_{sol}$ = 450° C., P = 300 bar and $T_{mix}$ controlled by the solvent flow rate.

| $T_{mix}$ | 230° C. | 249° C. | 257° C. | 270° C. | 286° C. |
| --- | --- | --- | --- | --- | --- |
| Mean size (PXRD) | 4 nm | 4 nm | 5 nm | 4 nm | 4 nm |
| ECSA (Hupd) | 52 m²/g | 46 m²/g | 69 m²/g | 57 m²/g | 40 m²/g |

The invention claimed is:

1. A method of preparing a catalytic structure having catalyst nanoparticles, the method comprising the steps of:
   providing a solution of a precursor compound in a liquid solvent at ambient conditions;
   providing a suspension of a support material having a specific surface area of at least 1 m²/g in a liquid solvent at ambient conditions;
   optionally sonicating the suspension of the support material;
   mixing the solution of the precursor compound and the suspension of the support material;
   providing a reducing reactive solvent or an oxidizing reactive solvent in a supercritical or subcritical state;
   admixing the mixture of the solution of the precursor compound and the suspension of the support material in the supercritical or subcritical reactive solvent to form a reaction solution;
   injecting the reaction solution into a reactor tube via a first inlet;
   allowing a reaction of the precursor compound in the supercritical or subcritical reactive solvent in the reactor tube to form the catalyst nanoparticles on the support material to provide the catalytic structure; and
   withdrawing the catalytic structure from the reactor tube via an outlet, which is downstream from the first inlet.

2. The method according to claim 1, wherein the reaction takes place under continuous conditions.

3. The method according to claim 1, wherein the reactor tube comprises one or more additional inlets downstream of the first inlet.

4. The method according to claim 1, wherein the reactive solvent has a temperature at or within 100° C. below, or above the temperature of the critical point ($T_{cr}$) of the reactive solvent and the reactive solvent is at a pressure at or within 30% below, or above the pressure of the critical point ($P_{cr}$) of the reactive solvent.

5. The method according to claim 1, wherein the catalyst nanoparticles are metallic and the metal is selected from the group consisting of a transition metal, a lanthanide, Sc, Ti, V, Cr, Mn, Fe, Co, Ni, Cu, Zn, Gd, Y, Zr, Nb, Mo, Ru, Rh, Pd, Ag, Cd, Pt, Au, Ir, W, Sr or a mixture thereof.

6. The method according to claim 1, wherein the catalyst nanoparticles comprise a metal compound.

7. The method according to claim 6, wherein the metal compound comprises a metal atom and a partner atom selected from the group consisting of groups 13, 14, 15 or 16 of the periodic table of the elements, and/or a ligand molecule.

8. The method according to claim 1, wherein the suspension of the support material and/or the reactive solvent comprises a dispersion agent.

9. The method according to claim 1, wherein the reactive solvent is ethanol, methanol, isopropanol, ethylene glycol or a combination thereof.

10. The method according to claim 1, wherein the ratio of the precursor compound to the support material is in the range of 1:100 to 100:1.

11. The method according to claim 1, wherein the reactive solvent comprises a component to activate the support material.

12. The method according to claim 1, wherein the support material is a carbon material selected from the group consisting of graphene, reduced graphene oxide, graphene oxide, carbon nanotubes (CNT), carbon black or carbon aerogel.

13. The method according to claim 1, wherein the support material is selected from the group consisting of aerogels, ceramic materials, metals, metal alloys, zeolites, tungsten carbide, metal oxides and metal sulphides.

14. The method according to claim 1, wherein the size of the catalyst nanoparticles is in the range of about 1 nm to about 50 nm.

15. The method according to claim 1, wherein the catalyst nanoparticles are monodisperse and have diameters with a standard deviation up to 50% of the diameter.

16. The method according to claim 1, wherein the distance between the first inlet and the outlet coupled with the flow rate of the reaction solution in the reactor tube provides a residence time for the reaction solution flowing through the reactor tube, which residence time is in the range of 2 seconds to 10 minutes.

* * * * *